United States Patent
Paige et al.

(10) Patent No.: US 9,280,144 B2
(45) Date of Patent: Mar. 8, 2016

(54) COMPENSATION FOR CANONICAL SECOND ORDER SYSTEMS FOR ELIMINATING PEAKING AT THE NATURAL FREQUENCY AND INCREASING BANDWIDTH

(71) Applicant: JONIX LLC, Harrisville, NH (US)

(72) Inventors: Nicholas Paige, Springfield, VT (US); John R. Hoogstrate, Jr., Harrisville, NH (US)

(73) Assignee: JONIX LLC, Harrisville, NH (US)

( * ) Notice: Subject to any disclaimer, the term of this patent is extended or adjusted under 35 U.S.C. 154(b) by 253 days.

(21) Appl. No.: 14/048,268

(22) Filed: Oct. 8, 2013

(65) Prior Publication Data
US 2015/0101085 A1    Apr. 9, 2015

(51) Int. Cl.
H02N 2/00 (2006.01)
H01L 41/00 (2013.01)
G05B 6/02 (2006.01)
G05B 5/01 (2006.01)

(52) U.S. Cl.
CPC ........................................ *G05B 5/01* (2013.01)

(58) Field of Classification Search
USPC ............ 318/560, 568.22, 606, 607, 608, 611, 318/615, 619, 621, 623; 310/311
See application file for complete search history.

(56) References Cited

U.S. PATENT DOCUMENTS

| | | | |
|---|---|---|---|
| 4,205,590 A * | 6/1980 | Stegner | 91/359 |
| 4,453,132 A * | 6/1984 | Stamler | 330/107 |
| 5,157,597 A | 10/1992 | Iwashita | |
| 5,197,102 A | 3/1993 | Sondermeyer | |
| 5,714,831 A * | 2/1998 | Walker | H02N 2/062 310/316.01 |
| 6,370,459 B1 | 4/2002 | Phillips | |
| 6,937,430 B2 * | 8/2005 | Ge et al. | 360/78.06 |
| 7,689,320 B2 | 3/2010 | Prisco et al. | |
| 7,756,592 B2 | 7/2010 | Craven | |
| 7,929,242 B2 * | 4/2011 | Takakura | 360/75 |
| 2007/0188222 A1 | 8/2007 | Nguyen | |
| 2007/0268068 A1 | 11/2007 | Yutkowitz | |
| 2010/0312365 A1 | 12/2010 | Levin et al. | |
| 2012/0053705 A1 | 3/2012 | Bensoussan | |

FOREIGN PATENT DOCUMENTS

KR    10-2012-0064940    6/2012

* cited by examiner

*Primary Examiner* — Bentsu Ro
(74) *Attorney, Agent, or Firm* — Robert Curcio; DeLio, Peterson & Curcio, LLC

(57) ABSTRACT

The present invention adds gain and phase into a canonical second order system in order to mitigate the adverse effects of unwanted resonance, where the gain is added to the forward path of a control loop of the system and is a ratio of the square of the system and mechanism frequencies, and the phase lead (H-factor) is added to the feedback path of the control loop of the system and is a complex ratio of these frequencies which includes a dc-component ($H_{dc}$) and a zero- or pole-component. By adding gain and phase lead, which is contrary to current approaches to addressing resonance, the present invention achieves the desired result of resonant free application in a canonical resonant-prone system of second order, and the methodology is applicable to higher order systems.

27 Claims, 22 Drawing Sheets

COMPENSATION FOR CANONICAL SECOND ORDER SYSTEMS FOR ELIMINATING PEAKING AT THE NATURAL FREQUENCY AND INCREASING BANDWIDTH

BACKGROUND OF THE INVENTION

1. Field of the Invention

The present invention relates to a method for limiting resonance, that is, eliminating peaking at a system's natural frequency, especially in electronic circuits, although the methodology may be applied to other oscillating systems as well, such as mechanical systems (spring mass systems, torque-inertia systems), piezoelectric transducer systems, and clamped systems, to name a few. The prior art addresses the resonance problem by filtering; essentially, operating at frequencies above or below the resonant frequency, but not at the resonant frequency. The present invention allows a system to operate through its resonant frequency without filtering by strictly introducing gain and phase shifting as the only means of compensating for the resonant frequency. In this manner, the present invention also increases the operating bandwidth of the system.

2. Description of Related Art

BACKGROUND THEORY

Resonance is the tendency of a system to oscillate with greater amplitude at some frequencies than at others. Frequencies at which the response amplitude is a relative maximum are known as the system's resonant frequencies. At these frequencies, even small periodic driving forces can produce large amplitude oscillations.

Resonance occurs when a system is able to store and easily transfer energy between two or more different storage modes (such as kinetic energy and potential energy in the case of a pendulum). However, there are some losses from cycle to cycle, called damping. When damping is small, the resonant frequency is approximately equal to the natural frequency of the system, which is a frequency of unforced vibrations.

The exact response of a resonance, especially for frequencies far from the resonant frequency, depends on the details of the physical system, and is usually not exactly symmetric about the resonant frequency. The transfer function T(s) of a closed-loop system is generally represented by the equation:

$$T(s) = G(s)/[1+G(s)H(s)]$$

where, $G(s)H(s)$ is the open loop transfer function, that is, the equivalent transfer function related to the error and feedback in the loop.

The closed-loop poles are the roots of the characteristic equation:

$$1+G(s)H(s)=0$$

For a closed loop system to be stable, the Nyquist plot of $G(s)H(s)$ must encircle the $(-1, j0)$ point as many times as the number of poles of $G(s)H(s)$ that are in the right half of the s-plane, and the encirclement, if any, must be made in the clockwise direction. The Nyquist plot is the polar (amplitude phase) plot of a GH transfer function on the complex plane as $s=j\omega$, and $\omega$ takes values from 0 to $\infty$.

The characteristic equation is $1+GH=0$ or $GH=-1$, so that when the system is just unstable, the amplitude of GH equals 1 and the phase equals 180°.

If at a given gain, the system is stable, then by increasing the gain and seeing which way the polar plot moves, one may ascertain the relative stability of the system; that is, determining how far the system is from going unstable. Generally, a polar plot of GH is utilized to assist in figuring out the relative stability of a closed loop system. In this manner, the relationship of the amplitude from $-1$ and how far the phase is from 180 degrees are indicators of stability.

The standard form of a second order transfer function is given by:

$$TF(s) = \frac{\omega_n^2}{s^2 + 2\xi\omega_n s + \omega_n^2}$$

where:

$\xi$ is the damping ratio; and $\omega_n$ is the natural frequency (radians/sec);

The second order system for a particular mechanism will have a closed loop transfer function TF(s) of:

$$TF_m(s) = \frac{\omega_m^2}{s^2 + 2\xi_m\omega_m s + \omega_m^2}$$

where:

$\xi_m$ is the damping factor for the mechanism; and $\omega_m$ is the angular frequency for the mechanism (radians/sec);

Generally of interest are values of $\xi \ll 1$. Substituting $s=j\omega$ gives:

$$TF(j\omega)=1/\{[1-(\omega/\omega_m)^2]+2j\xi\omega/\omega_m\}$$

As can be calculated at low frequencies, TF will ultimately reach the 0 dB asymptote. At high frequencies, a $-40$ dB/decade asymptote can be realized. These two asymptotes meet at $\omega=\omega_m$. The phase is 0 degrees at low frequencies and at $\omega=\omega_m$ it is $-90$ degrees. For higher frequencies, the phase slowly approaches $-180$ degrees.

The peak values $TF_p$, $\omega_p$, and the bandwidth of a second order natural system can be represented as:

$$TF(s) = \frac{\omega_n^2}{s^2 + 2\xi\omega_n s + \omega_n^2}$$

$$L^{-1} = TF(s)/s = y(t) = 1 - e^{-\sigma t}\{\cos(\omega_d t) + (\sigma/\omega_d)\sin(\omega_d t)\}$$

$$\omega_d = \omega_n * \sqrt{(1-\xi^2)}$$

where, $$\sigma = \xi\omega_n$$

$$y(t) = 0, \omega_d t_p = \pi, t_{peak} = \pi/(\omega_n * \sqrt{(1-\xi^2)})$$

$$y(t_p) = 1 + TF_p \to TF_p$$

$$= \exp-(\pi\xi/\sqrt{(1-\xi^2)}) \quad 0 \le \xi \le 1.$$

$$= 1 - \xi/0.6 \quad 0 \le \xi \le 0.6.$$

In order to find out the frequency $\omega_p$ at which the peak transfer function value occurs in frequency, the following calculation is used:

$$\omega_p = \omega_n * \sqrt{(1-2\xi^2)}; \text{ which is valid for } \xi < 0.7071$$

Once the resonant frequency is known, the methods in the prior art for addressing resonance are well established. Some methods analyze the resonance frequency and provide filtering to greatly dampen or remove the resonance frequency, or allow a pass band in a frequency range away from resonant frequency. Commonly, bandpass filters are fabricated to allow only a portion of the frequency spectrum to pass, and to keep resonant frequencies from upsetting the system.

Second order filters can be designed for lowpass, highpass, bandpass, or notch filters. All four types can be expressed in a standard form shown below:

$$H(s) = \frac{N(s)}{(s^2/\omega_n^2) + s/(Q\omega_n) + 1}$$

In this standard form, $N(s)$ is a polynomial in s of degree $m \leq 2$.

If $N(s)=k$, the system is a lowpass filter with a DC gain of k. If $N(s)=k\,s^2/\omega_n^2$, the system is a highpass filter with a high frequency gain of k. If $N(s)=k*s/(Q\omega_n)$, the system is a bandpass filter with a maximum gain of k. And, if $N(s)=k(1-s^2/\omega_n^2)$, the system is a notch filter with a gain of k.

RELATED ART

The prior art is replete with the introduction of filters of all types for mitigating the effects of resonance in a system. For example, in U.S. Patent Publication No. 2007/0268068 to Yutkowitz, a method for simultaneous selection of filters and loop proportional gain for a closed loop system is presented. In this design, the tuning method determines the combination of filter parameters that allows the loop proportional gain ($K_p$) to be maximized while meeting a specified set of criteria for stability margins. The method detects a frequency response function, determines one or more resonant and anti-resonant frequencies of a speed controller, and estimates the total inertia of the system. It then determines an upper limit, lower limit, and initial candidate value for proportional gain ($K_p$) based on the frequency response function and the total inertia. The method simultaneously selects filters and loop proportional gain for resonant systems. The method optimizes the deployment and parameterization of current set-point filters such that they provide just the right amount of amplitude attenuation while the accompanying phase loss is small enough to allow the proportional gain $K_p$ to be maximized. Importantly, this methodology works to deploy notch filters. Thus, unlike the present invention, loop shaping filters are employed based on algorithmic results, which may be either notch filters or low-pass filters.

U.S. Patent Publication No. 2012/0053705 to Bensoussan is directed to a system and method for feedback control, including a variety of linear class transfer-function based plants, optimizable in the time and frequency domains. (The "plant" is a preexisting system that does not meet all the desired frequency and time domain design specifications of the feedback system.) The Bensoussan invention establishes a method in which the poles of a controller depend upon its gain. It does this by having a quasi-linear controller adapt to stability margins with the increase in gain. The controller does this by pushing the pole which wanders farther away from the jω-axis with increase gain by relating the poles of the controller to its gain.

In U.S. Pat. No. 5,157,597 to Iwashita a method of detecting oscillation and automatically adjusting speed loop gain is presented. The position loop gain is intentionally set to a large value to rotate a motor in the forward and reverse directions in an oscillating fashion. The methodology for adjusting the gain in the Iwashita invention includes: adjusting a speed loop gain of a servo system which has the steps of: (a) setting a position deviation-to-position loop gain characteristic of the servo system such that the position loop gain of the servo system assumes a large value in a predetermined position deviation range; (b) periodically extracting a position deviation parameter generated when the servo system is operated in accordance with a position command falling within the predetermined position deviation range; (c) determining a main oscillation component of the position deviation parameter; and (d) automatically adjusting the speed loop gain of the servo system such that the main oscillation component falls within a predetermined frequency range.

In U.S. Pat. No. 7,756,592 to Craven a feedback control for controlling the behavior of a plant is presented. A simulated signal is generated by simulating an aspect of an assumed behavior in dependence upon the stimulus. The simulated signal is then subtracted from the feedback signal (derived from the output signal). The delta in the two signals is used to modify the input signal by feedback. Thus, a feedback correction signal is obtained by taking the difference between the output of the plant and the output of a simulator that models the plant. The error in the simulated signal to the actual signal is attributable to oscillation, which is reduced by the methodology of Craven. Craven does not adjust gain to eliminate or compensate for resonance, and as such, does not teach or suggest the salient features of the present invention.

In U.S. Patent Publication No. 2010/0312365 to Levin, et al., a notch filter is presented for mode suppression that is adaptive to variations in parameters of flexible modes. The scheme updates itself to cancel the effect of the modal dynamics on the system's performance. Thus, the notch filter may be designed more narrowly. In this manner, the filter may be designed to fully suppress the flexible mode at the resonant frequency.

In U.S. Pat. No. 7,689,320 to Prisco, et al., a joint motion controller adapted to reduce instrument tip vibrations is taught. The Prisco invention discloses a robotic arm with a controller having a filter in its forward path to attenuate master input commands that may cause instrument tip vibrations. Prisco considers that vibrations in this case may be at the resonant frequency of the robotic arm assembly, or that of a mechanical structure supporting the robotic arm assembly. With respect to resonance, the forward path filter of the Prisco design includes notch filter characteristics to reduce the effects of resonant frequencies of the robotic arm assembly and a mechanical structure supporting the robotic arm assembly. This is counter to the present invention's methodology.

None of the prior art designs teach an algorithmic approach to resonance compensation that does not include the deployment of extra filters, and instead strictly introduces gain and phase shifting as the only means of compensating for the resonant frequency.

SUMMARY OF THE INVENTION

Bearing in mind the problems and deficiencies of the prior art, it is therefore an object of the present invention to provide a method and apparatus for eliminating resonance by adding gain to the forward loop instead of providing additional filtering.

It is another object of the present invention to introduce gain and phase shifting as the only means of compensating for the resonant frequency.

The above and other objects, which will be apparent to those skilled in the art, are achieved in the present invention which is directed to a method of eliminating peaking and increasing bandwidth of a canonical second order system having a system frequency, and a resonant-prone mechanism having a mechanism frequency, the method comprising: forming a control loop for the resonant-prone mechanism, the control loop including a forward path and a feedback path; adding gain into the forward path of the control loop, wherein the added gain includes a function of the system and mechanism frequencies; and adding a phase lead or feedback factor (H-factor) into the feedback path of the control loop, the phase lead being a complex ratio of the system and mechanism frequencies.

The gain added may be a ratio of the square of the system and mechanism frequencies and the phase lead or feedback factor is a product of a dc component and a zero- or pole-component. The dc component of the phase lead factor is preferably a ratio of the difference in the squares of the angular system frequency and the mechanism frequency, to the square of the system angular frequency. The zero- or pole-component is represented by the expression:

$$\left\{1 + 2 * \frac{(\xi_s \omega_s - \xi_m \omega_m)}{\omega_s^2 - \omega_m^2} * s\right\}.$$

In a second aspect, the present invention is directed to a method of eliminating peaking and increasing bandwidth of a canonical second order system having a system frequency, and a resonant-prone mechanism having a mechanism frequency, the method comprising: forming a control loop for the resonant-prone mechanism, the control loop including a forward path and a feedback path; adding gain into the forward path of the control loop for the resonant-prone mechanism, wherein the gain added includes a ratio of the square of the system and mechanism frequencies; and adding a phase lead or feedback factor (H-factor) into the feedback path of the control loop for the resonant-prone mechanism, the phase lead being a complex ratio of the system and mechanism frequencies.

The phase lead or feedback factor (H-factor) preferably includes a dc-component ($H_{dc}$) and a zero- or pole-component, such that the dc-component is represented by the expression:

$$H_{dc} = \frac{\omega_s^2 - \omega_m^2}{\omega_s^2}$$

and the zero- or pole-component is represented by the expression:

$$\text{zero-component} = \left\{1 + 2 * \frac{(\xi_s \omega_s - \xi_m \omega_m)}{\omega_s^2 - \omega_m^2} * s\right\}$$

where, $\omega_s$ and $\omega_m$ are the system and mechanism angular frequencies, respectively, and $\xi_s$ and $\xi_m$ are the systems and mechanism damping factors, respectively, and the product of the $H_{dc}$ component and the zero-component is the phase lead or feedback factor in the frequency domain to act with the interjected gain at eliminating the peaking at the system's natural frequency.

The added gain preferably includes a ratio of the square of the system and mechanism frequencies and is expressed as a gain or control portion, K(s):

$$K(s) = \frac{\omega_s^2}{\omega_m^2}$$

The method further includes adding the gain and the phase-lead or feedback into the control loop of the system, the gain being expressed as:

$$K(s) = \frac{\omega_s^2}{\omega_m^2};$$

and the phase-lead being expressed as:

$$\frac{\omega_s^2 - \omega_m^2}{\omega_s^2} * \left\{1 + 2 * \left(\frac{\xi_s \omega_s - \xi_m \omega_m}{\omega_s^2 - \omega_m^2}\right) * s\right\}$$

where, $\omega_s$ and $\omega_m$ are the system and mechanism angular frequencies, respectively, and $\xi_s$ and $\xi_m$ are the systems and mechanism damping factors, respectively.

In a third aspect, the present invention is directed to a method of eliminating peaking and increasing bandwidth of a Fast Tool Servo system having a piezo actuator, a system frequency, and a mechanism frequency, the method comprising: forming a control loop for the resonant-prone system, the control loop including a forward path and a feedback path; adding gain into the forward path of the control loop of the system, wherein the gain added includes a function of the system and mechanism frequencies; and adding a phase lead or feedback factor (H-factor) into the feedback path of the control loop of the system, the phase lead being a complex ratio of the system and mechanism frequencies, wherein the Fast Tool Servo system is represented by a canonical second order system having the system frequency, and a resonant-prone mechanism having the mechanism frequency.

In a fourth aspect, the present invention is directed to a fast tool servo system having a piezo actuator, a system frequency, and a mechanism frequency, comprising: a piezo-drive linear actuator; a fast tool servo; a control loop having a forward path and a feedback path; gain electronics to provide a gain component for adding gain into a forward path of the control loop of the system, wherein the gain added includes a function of the system and mechanism frequencies; and phase electronics to a phase component for adding a phase lead or feedback factor (H-factor) into the feedback path of the control loop of the system, the phase lead being a complex ratio of the system and mechanism frequencies.

The fast tool servo system includes having the gain and phase electronics for adding the gain and the phase-lead or feedback into the system, the gain being expressed as:

$$K(s) = \frac{\omega_s^2}{\omega_m^2};$$

and the phase-lead being expressed as:

$$\frac{\omega_s^2 - \omega_m^2}{\omega_s^2} * \left\{ 1 + 2 * \left( \frac{\xi_s \omega_s - \xi_m \omega_m}{\omega_s^2 - \omega_m^2} \right) * s \right\}$$

where, $\omega_s$ and $\omega_m$ are the system and mechanism angular frequencies, respectively, and $\xi_s$ and $\xi_m$ are the systems and mechanism damping factors, respectively.

In a fifth aspect, the present invention is directed to a scanning tunneling microscope using a piezo-electric positioner, having a piezo actuator, a system frequency, and a mechanism frequency, comprising: a scanning tunneling microscope; a piezo-electric positioner; a control loop having a forward path and a feedback path; gain electronics to provide a gain component for adding gain into the forward path of the control loop of the system, wherein the gain added includes a function of the system and mechanism frequencies; and phase electronics to provide a phase component for adding a phase lead or feedback factor (H-factor) into the feedback path of the control loop of the system, the phase lead being a complex ratio of the system and mechanism frequencies.

The scanning tunneling microscope using a piezo-electric positioner includes having the gain and phase electronics for adding the gain and the phase-lead or feedback into the system, the gain being expressed as:

$$K(s) = \frac{\omega_s^2}{\omega_m^2};$$

and
the phase-lead being expressed as:

$$\frac{\omega_s^2 - \omega_m^2}{\omega_s^2} * \left\{ 1 + 2 * \left( \frac{\xi_s \omega_s - \xi_m \omega_m}{\omega_s^2 - \omega_m^2} \right) * s \right\}$$

where, $\omega_s$ and $\omega_m$ are the system and mechanism angular frequencies, respectively, and $\xi_s$ and $\xi_m$ are the systems and mechanism damping factors, respectively.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

Figure 1:
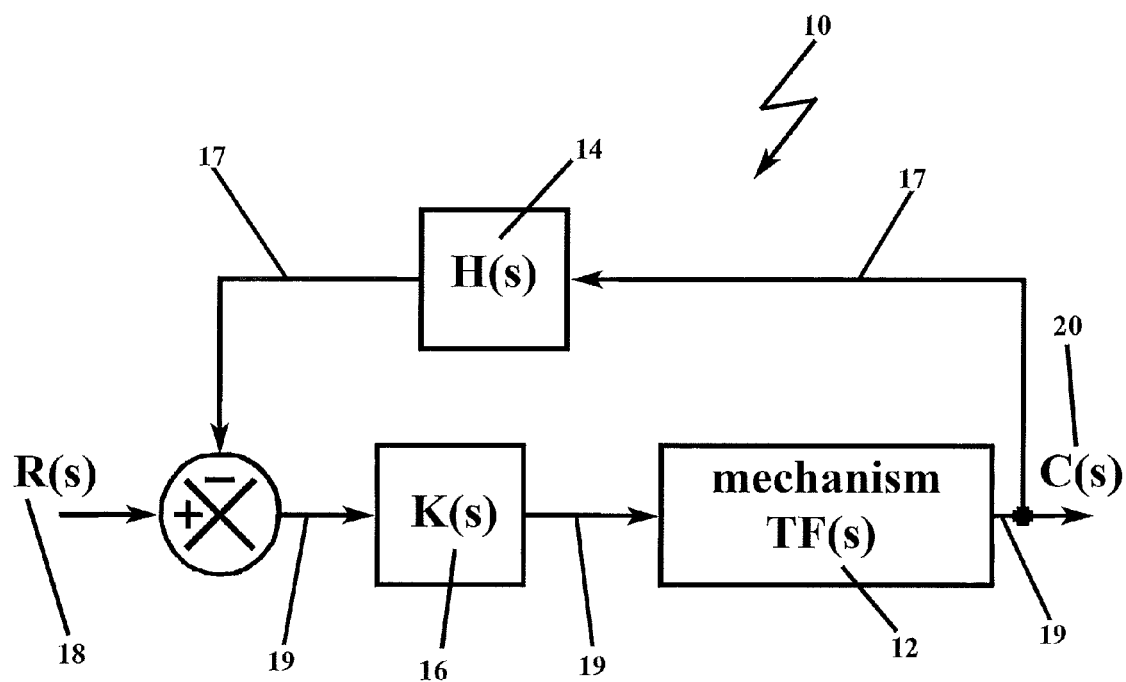
FIG. 1 depicts symbolically a system for employing the methodology of the present invention represented by a mechanism subject to resonance, which may be a mechanical, electrical, optical, or other resonant-prone embodiment, a phase lead adjustment and a gain adjustment.

DESCRIPTION OF THE PREFERRED
EMBODIMENT(S)

In describing the preferred embodiment of the present invention, reference will be made herein to FIGS. 1-22 of the drawings in which like numerals refer to like features of the invention.

The methodology of the present invention solves the problem of unwanted resonance in resonance-prone systems. The prior art has gone to great lengths to remove the resonance altogether, employing notch filters at frequencies identical to the resonance frequency to remove selectively the resonance frequency entirely from the circuit function, and/or low-pass filter systems that allow frequencies up to the resonance frequency to pass, but cutoff frequencies that are higher than the low-pass filter bandwidth, and high-pass filter systems that allow frequencies below the high-pass filter bandwidth to be cutoff.

Counter-intuitive to the operative solutions of the prior art, the present invention adds an analytically derived, predetermined gain to the loop that effectively functions to remove the resonance from the loop. The methodology calculates a particular phase lead (referred to as the "H-factor") and adds this to the loop circuit to obtain the proper gain/phase combination that would make the system stable. That is, the H-factor adds phase lead to achieve the proper phase margin in the system necessary to stabilize the system. The methodology of the present invention analytically determines the H-factor, a frequency domain factor, as a complex ratio of the square of the difference in the system frequency $\omega_s$ and the frequency of the mechanism to be controlled $\omega_m$. The H-factor is represented by a "dc" component, and a "zero" or "pole" component, such that H(s) may be expressed in the following manner:

$$H(s) = \overbrace{\frac{\omega_s^2 - \omega_m^2}{\omega_s^2}}^{H_{dc}} \left\{ \overbrace{\frac{2\xi_s\omega_s - 2\xi_m\omega_m}{\omega_s^2 - \omega_m^2}}^{Zero} * s + 1 \right\} \quad (1)$$

where:

$$\omega_m = 2\pi f_c \quad (2)$$

$$\xi_m = \frac{f_{1m} + f_{2m}}{2\sqrt{(f_{1m}f_{2m})}} \quad (3)$$

$$\xi_s = \frac{f_{1s} + f_{2s}}{2\sqrt{(f_{1s}f_{2s})}} \quad (4)$$

In order to increase the bandwidth in the system, gain is required. The present methodology establishes a "K-factor" to accommodate the introduction of gain. The present invention defines the K-factor in the following manner:

$$K = \omega_s^2/\omega_m^2 \quad (5)$$

where, $$\omega_s = \sqrt{K} * \omega_m \quad (6)$$

FIG. 1 depicts symbolically a control system 10 for employing the methodology of the present invention represented by a mechanism 12 subject to resonance, which may be a mechanical, electrical, optical, or other resonant-prone embodiment, and having a mechanism transfer function TF(s), a sub-system for employing the analytically determined phase lead 14, H(s), into the feedback path 17 of the control loop of the control system 10, a sub-system for introducing gain, otherwise referred to as K-factor 16, K(s), into a forward path 19 of the control loop, with signal input 18, R(s), and signal output 20, C(s).

The transfer function for system 10 is represented by:

$$\frac{C(s)}{R(s)} = \frac{K(s)TF(s)}{1 + K(s)TF(s)H(s)} \quad (7)$$

where,

K(s) is the gain part of the forward path;

H(s) is the feedback ratio.

By introducing a phase lead (H) and gain factor (K-factor), the resonance of the system is removed from consideration. This is counter-intuitive to the prior art insomuch as normally an introduction of gain would precipitate resonance, not reduce or eliminate it. Thus, the combination of gain and phase in the present invention is contrary to the methodologies of the prior art.

Assigning $\omega_s$ as the required angular frequency for C(s)/R(s), and $\xi_s$ as the required damping factor for the system transfer function, TF(s)=C(s)/R(s), which may be reformulated as:

$$\frac{C(s)}{R(s)} = \frac{\omega_s^2}{s^2 + 2\xi_s\omega_s s + \omega_s^2} \quad (8)$$

The transfer function of the mechanism can be expressed by the damping factor and angular frequency of the mechanism itself:

$$TF(s) = \frac{\omega_m^2}{s^2 + 2\xi_m\omega_m s + \omega_m^2} \quad (9)$$

Setting equations (7) and (8) equal, and using the substitution of equation (9) for TF(s) yields:

$$\frac{\omega_s^2}{s^2 + 2\xi_s\omega_s s + \omega_s^2} = \frac{K(s) * \frac{\omega_m^2}{s^2 + 2\xi_m\omega_m s + \omega_m^2}}{1 + K(s) * \frac{\omega_m^2}{s^2 + 2\xi_m\omega_m s + \omega_m^2} * H(s)} \quad (10)$$

Solving equation (10) for H(s) produces an expression for the phase lead:

$$H(s) = \frac{(K(s)\omega_m^2 - \omega_s^2)s^2 + (2K(s)\omega_m^2\xi_s\omega_s - 2\omega_s^2\xi_m\omega_m)s + K(s)\omega_m^2\omega_s^2 - \omega_s^2\omega_m^2}{K(s)\omega_m^2\omega_s^2} \quad (11)$$

In order to implement the methodology of the present invention as depicted by equation (11), the $s^2$ term is made equal to zero by making the product $K(s)\omega_m^2$ equal to $\omega_s^2$. Thus, $$K(s) = \frac{\omega_s^2}{\omega_m^2} \quad (12)$$

Substituting equation (12) into equation (11) and simplifying, yields:

$$H(s) = \frac{\omega_s^2 - \omega_m^2}{\omega_s^2} \left\{ 1 + 2 * \left( \frac{\xi_s\omega_s - \xi_m\omega_m}{\omega_s^2 - \omega_m^2} \right) * s \right\} \quad (13)$$

Equations (12) and (13) specify the gain and feedback ratio that make it possible to change the response of any second order system with the $\omega$ and $\xi$ values of equation (9) into a system with the response specified by the $\omega$ and $\xi$ values of equation (8). This is accomplished by putting the mechanism inside a control loop conforming to the gain and feedback relationships analytically identified above.

It should be noted that although the application of the present invention as described herein lends itself to canonical second order systems, the present invention may also be employed for higher order systems, and the expressions delineated herein may be modified for higher order system applications while maintaining the analytical framework of the methodology identified by the present invention. In this manner, the present invention is not limited to applications of only canonical second order systems, but may be applied to higher order systems as well.

A Second Order Resonating System Having Resistive, Capacitive, and Inductive Properties (an RLC Circuit)

Figure 2:
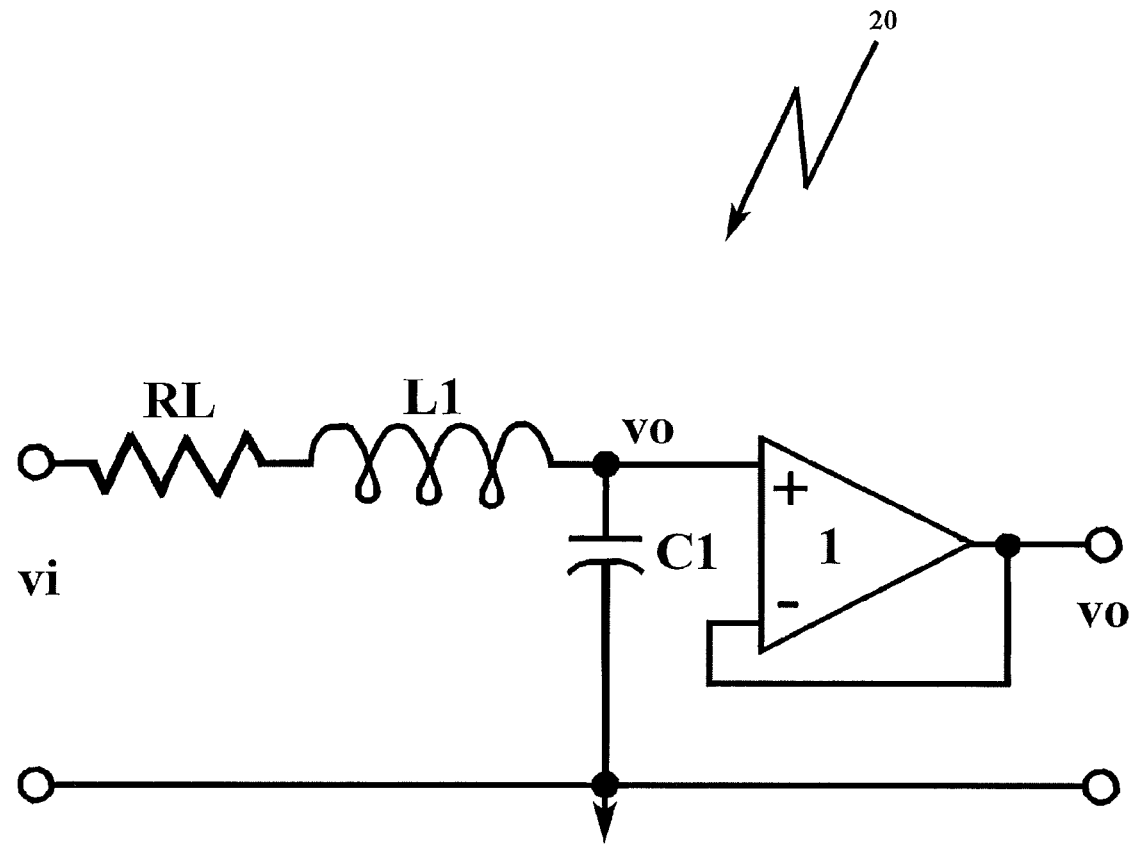
FIG. 2 depicts an exemplary RLC resonant circuit to which the resonance mitigation methodology of the present invention may be employed.

Employing the gain inducing and phase lead relationships of the present invention to a second order resonating system having resistive, capacitive, and inductive properties, such as one that may be modeled using R-L-C components, is demonstrated for exemplary purposes. FIG. 2 depicts an R-L-C resonant circuit that is a candidate for employing the resonance mitigation of the present invention.

In FIG. 2, circuit 20 comprises a second order, resonating R-L-C circuit 20. $R_L$ is the resistance of the inductor in ohms, and $L_1$ is the inductance of the inductor in Henries, $C_1$ is the capacitance in Farads, $v_i$ is the input voltage, and $v_o$ is the output voltage. The transfer function in the frequency domain for the circuit 20 of FIG. 2 can be expressed in the following manner:

$$\frac{V_o(s)}{V_i(s)} = \frac{\frac{1}{L_1 C_1}}{s^2 + \frac{R_L}{L_1} * s + \frac{1}{L_1 C_1}} \quad (14)$$

Spring-Mass-Damper Positioning Systems

Examples where the methodology of the present invention may be employed is in mechanical systems. Most systems are typically simplified to spring-mass-damping systems, and as such, lend themselves to issues of resonance, requiring resonance mitigation.

A Torsional Spring-Mass-Damper Positioning System

Figure 3:
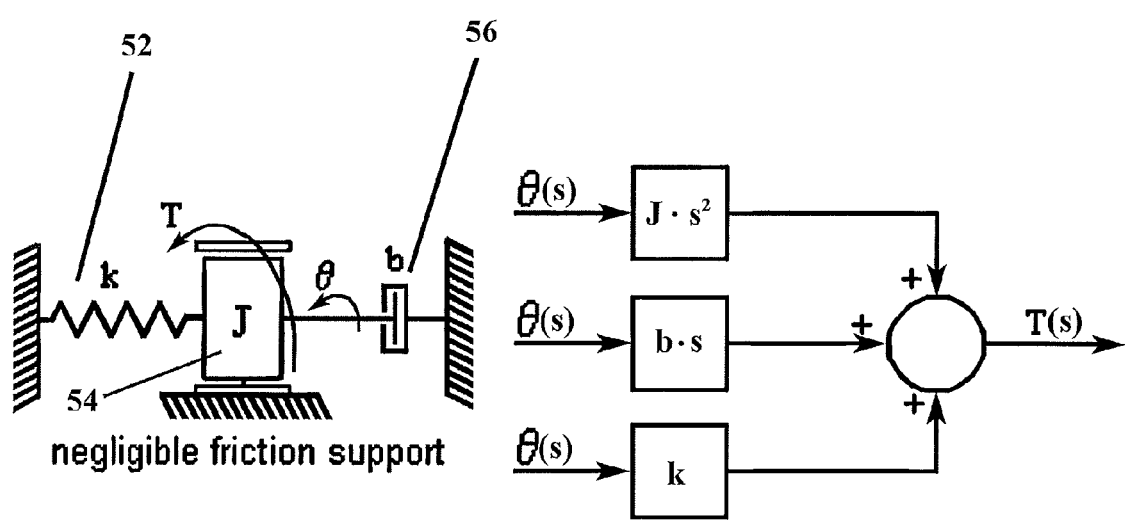
FIG. 3 depicts an exemplary torsional spring-mass-damper positioning system for the employment of the system transfer function of the present invention.

FIG. 3 depicts an exemplary torsional spring-mass-damper positioning system for the employment of the system transfer function of the present invention. Spring 52 has spring constant k. The mechanism 54 includes a torsional force T at an angle $\theta$, generating an inertia J, and acting on a damper 56 having a damping coefficient b. In the frequency domain, T(s) represents the torque of the system, and can be expressed as:

$$T(s) = \theta(s)*J*s^2 + \theta(s)*b*s + \theta(s)*k \quad (15)$$

Solving equation (15) for the ratio $\theta(s)/T(s)$ yields:

$$\frac{\Theta(s)}{T(s)} = \frac{k/J}{k*\{s^2 + (b/J)*s + k/J\}} \quad (16)$$

A Spring-Mass-Damper Positioning System

Figure 4:
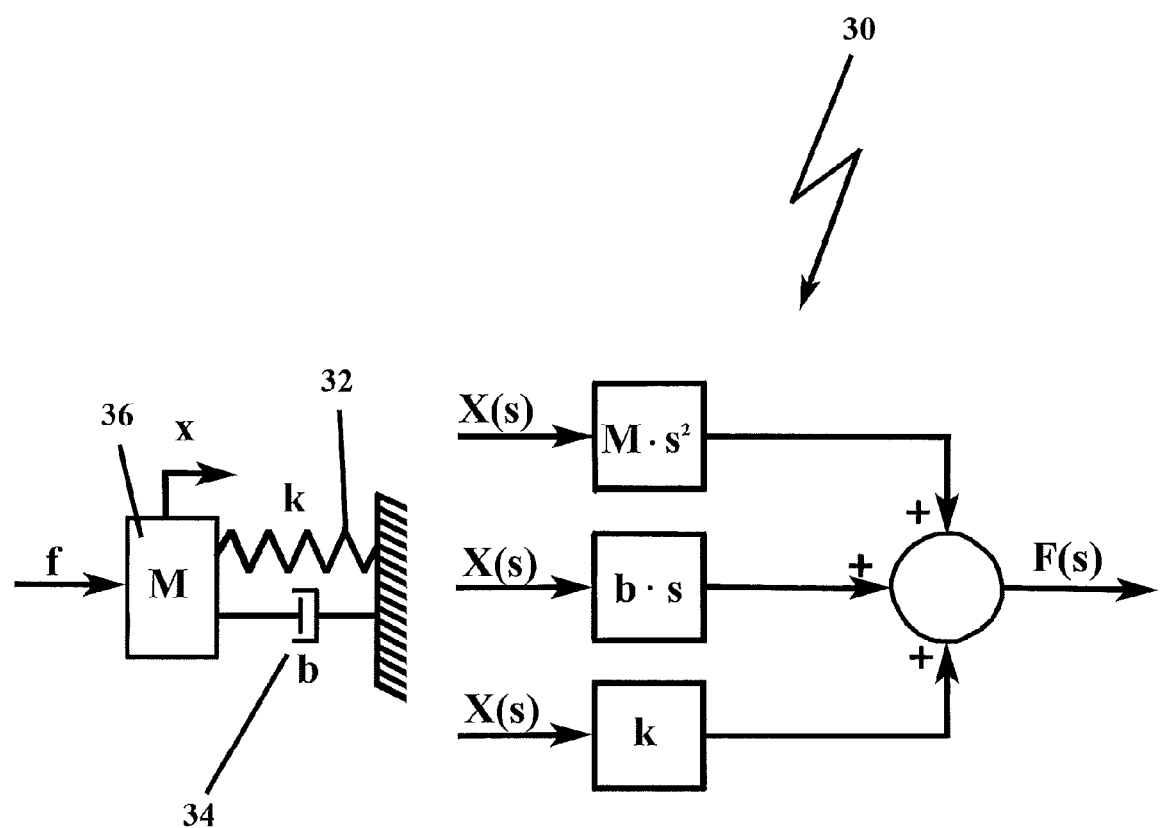
FIG. 4 depicts a spring-mass-damper positioning system, a second order mechanism capable of having gain and phase lead added to the system to mitigate resonance.

FIG. 4 depicts a spring-mass-damper positioning system—a second order mechanism capable of having gain and phase lead interjected to the system to mitigate resonance. In FIG. 4, system 30 includes spring 32 having spring constant k, generally represented in units of kg/m; damper 34 with damping factor b, usually represented in units of kg*sec/m, and mass 36 having mass M of defined units kg*sec$^2$/m.

The system transfer function F(s) is represented by the individual transfer functions X(s) of each of the system's properties (mass, damper, and spring):

$$F(s) = X(s)Ms^2 + X(s)bs + X(s)k \quad (17)$$

Thus, the transfer function for the spring-mass-damper elements can be derived as the following:

$$\frac{X(s)}{F(s)} = \frac{1}{k} * \frac{k/M}{s^2 + (b/M)s + k/M} \quad (18)$$

Because the equations (14), (16), and (18) fit the canonical form for a second order transfer function, the response of the example mechanisms can be changed using equations (12) and (13) and placing the mechanism inside a control loop with gain and feedback.

Figure 5:
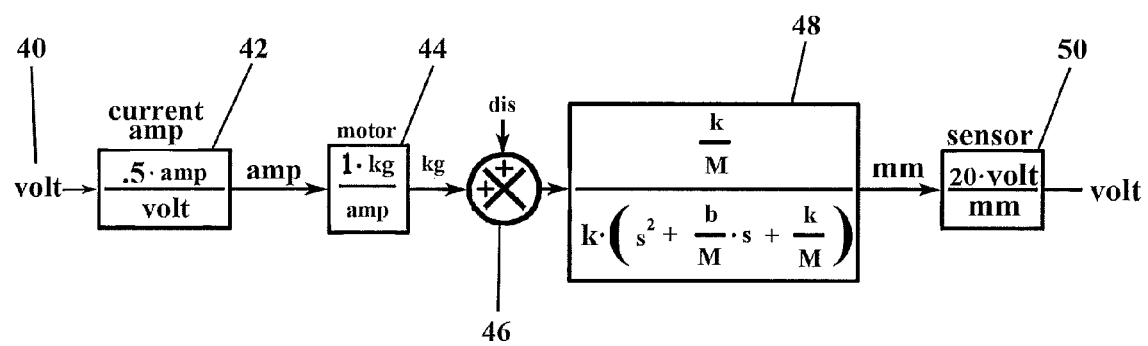
FIG. 5 is a block diagram depicting the drivers and sensors employed to the spring-mass-damper system of FIG. 4.

As a numerical example, and for demonstrative purposes only, particular values for k and M are selected:
M=0.0231 kg*sec$^2$/m;
b=3.175 kg*sec/m; and
k=10(10$^3$) kg/m=10 kg/mm FIG. 5 is a block diagram depicting the drivers and sensors employed to the spring-mass-dampening system of FIG. 4. Input voltage 40 is transformed by current-amp constant 42, $k_{ac}$, ($k_{ac}$=0.5 amp/volt). The output of this transformation 42 is a current for driving motor 44, delivering a force based on the current input. In this example, a motor force constant, $k_{mf}$, of 1 kg/amp is generated and provided to a summing node 46 where control forces and disturbance forces are added. The mechanism transfer function 48 is then employed, as depicted in equation (18) above, and an output is realized, which can then be transmitted to a sensor 50 capable of outputting a voltage per unit millimeter perturbation, such as for example, a sensor sensitivity constant, $k_{ss}$, of 20 volts/mm for a final voltage output.

Figure 6A:
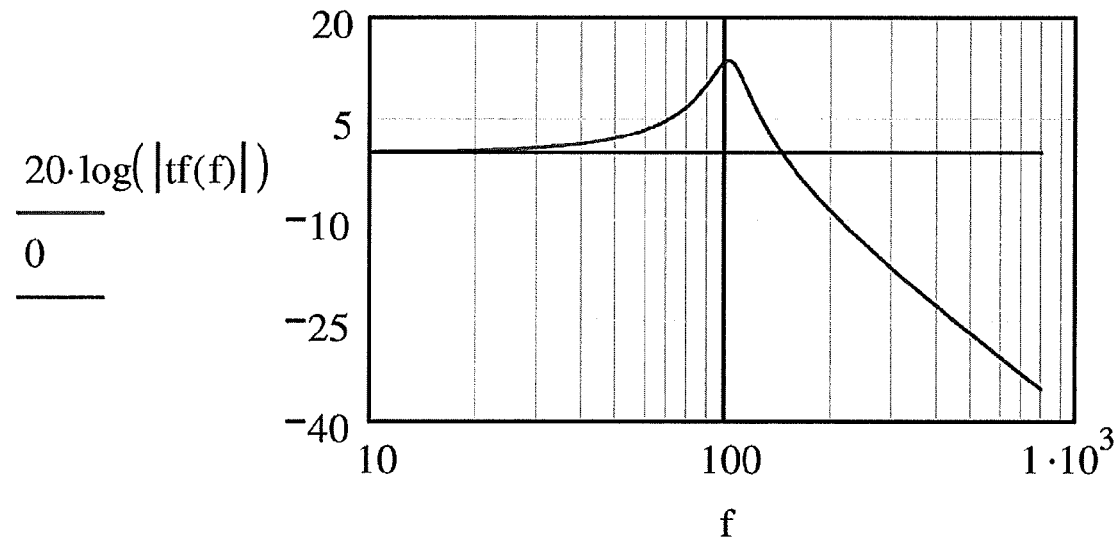
FIGS. 6A and 6B depict the magnitude and phase plots, respectively, of the transfer function of a numerical example as a function of frequency with effects of drivers and sensors included in the results.
Figure 6B:
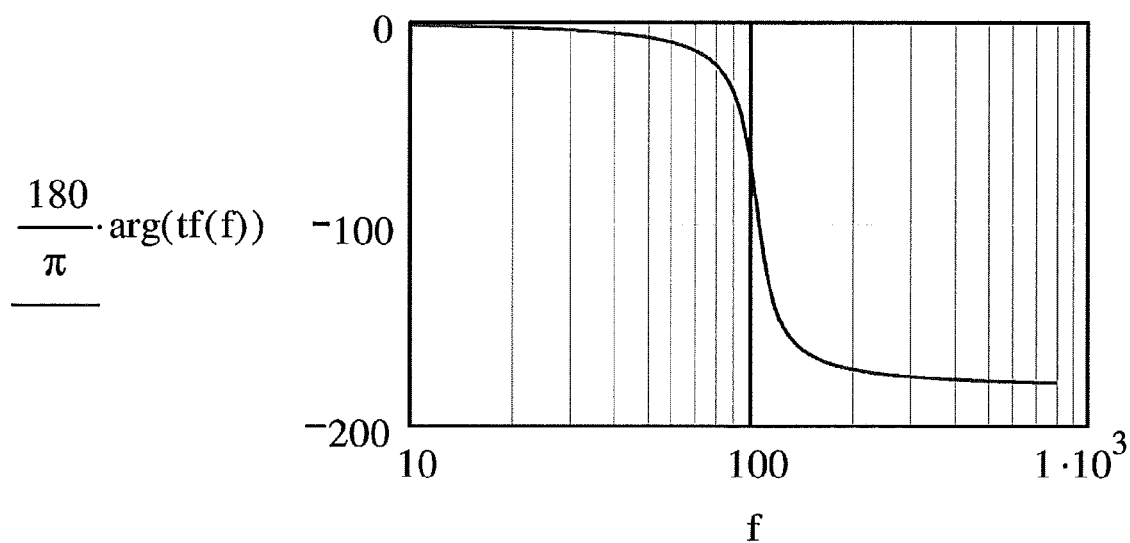

The values for $\omega_m$, $f_m$, and $\xi_m$ are calculated from the numerical values given above:
$\omega_m = \sqrt{(k/M)} = 657.53$ rad/sec;
$f_m = \omega_m/(2\pi) = 104.65$ Hz; and
$\xi_m = b/[2(\sqrt{(Mk)})] = 0.104$ Thus, the mechanism without disturbance forces would be represented by equations (9) and (18). FIGS. 6A and 6B depict the magnitude and phase plots, respectively, of the transfer function of a numerical example as a function of frequency with effects of drivers and sensors included in the results.

Figure 7:
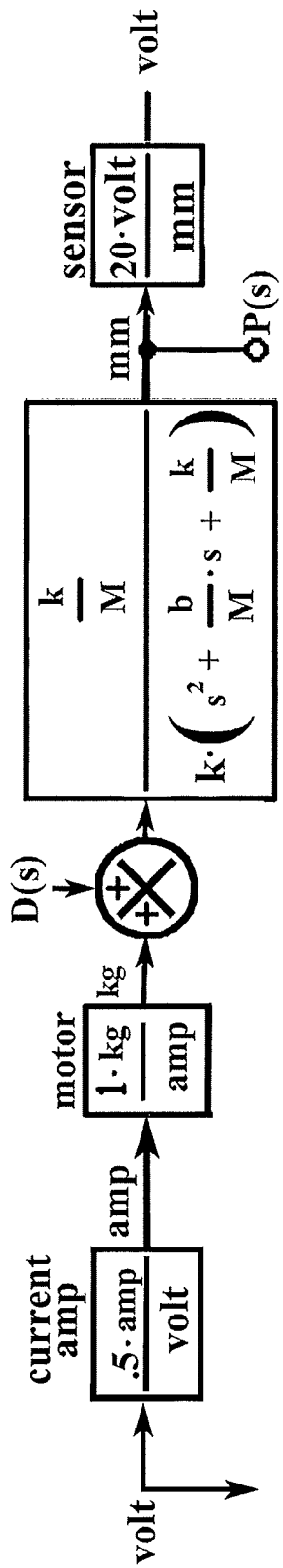
FIG. 7 is a block diagram for the example of FIG. 4 with the input grounded and a monitor position, P(s), added.

FIG. 7 is the block diagram of FIG. 5 with the input grounded and a monitor position, P(s), added to investigate mass motion caused by disturbance forces.

From FIG. 7, equation (18) can be represented as P(s)/D(s). If we allow a disturbance force in the frequency domain, force (f), to be 0.01 kg and s equal to j2$\pi$f, then:

$$p(f) = \frac{\text{Force}(f)}{k} * \frac{\omega_m^2}{(j2\pi f)^2 + 2\xi_m \omega_m 2j\pi f + \omega_m^2} \quad (19)$$

Figure 8:
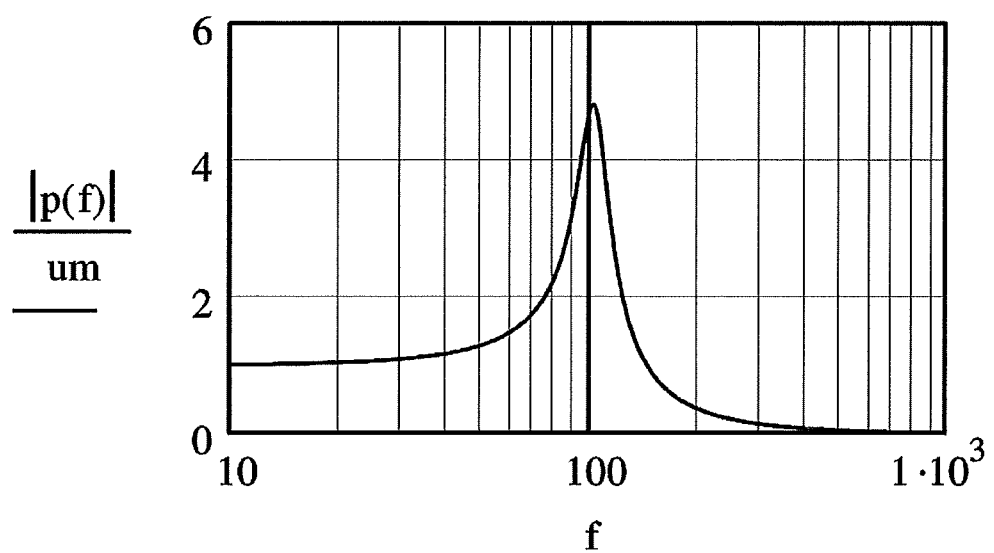
FIG. 8 depicts a plot of the position, p(f), for the example of FIG. 7, caused by a disturbance force as a function of frequency.

The disturbance motion of the mechanism cannot be controlled around its resonance. The force can be from any source acting on the mechanism. FIG. 8 depicts a plot of the position, p(f), for the system represented by FIG. 7, caused by a disturbance force as a function of frequency. FIG. 8 demonstrates the peaking at resonance as the absolute value of p(f), |p(f)|.

Using equations (12) and (13) to calculate the values of H(s) and K(s) in the basic second order control system of FIG. 1, and solving numerically:

let $f_s$=600 Hz, then $\omega_s$=3.77(10³) Hz;
$K(s)=\omega_s^2/\omega_m^2$;
K=K(s)=32.873; and
$\xi_s=\sqrt{2}/2$ for a flat response that is −3 dB at $f_s$.

From equation (13) the gain part of H(s) is identified as follows:

$$g_{kh} = \frac{\omega_s^2 - \omega_m^2}{\omega_s^2}$$

Numerically, $g_{kh}$ is 0.97 for the above example, and the constant for the s-term is:

$$k_s = 2 * \frac{(\xi_s\omega_s - \xi_m\omega_m)}{\omega_s^2 - \omega_m^2} * s; k_s = 3.769(10^{-4}) \text{ sec}$$

Thus, $H(s)=g_{kh}(1+k_s*s)$.

Figure 9:
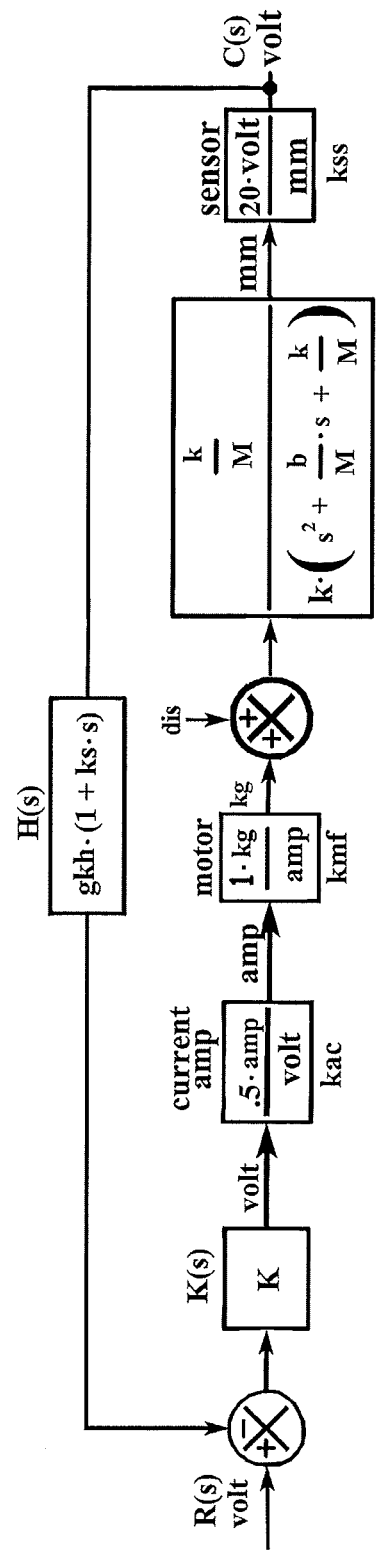
FIG. 9 depicts the control system of FIG. 5 with the interjection of gain, K(s), and H(s), pursuant to the methodology of the present invention.

This yields a new control system using the present invention with K(s) and H(s) added in. FIG. 9 depicts the control system of FIG. 5 with the interjection of gain, K(s), and H(s), pursuant to the methodology of the present invention. Using the block diagram of FIG. 9, and the expression for the transfer function of the present invention as found in equation (7), the system transfer function, C(s)/R(s), is represented as:

$$\frac{C(s)}{R(s)} = \frac{K*k_{ac}*k_{mf}\left\{\frac{1}{k}*\frac{k/M}{s^2+(b/M)s+k/M}\right\}k_{ss}}{1+K*k_{ac}*k_{mf}} \quad (20)$$
$$\left\{\frac{1}{k}*\frac{k/M}{s^2+(b/M)s+k/M}\right\}k_{ss}\ [g_{kh}\ (1+k_s*s)]$$

Figure 10A:
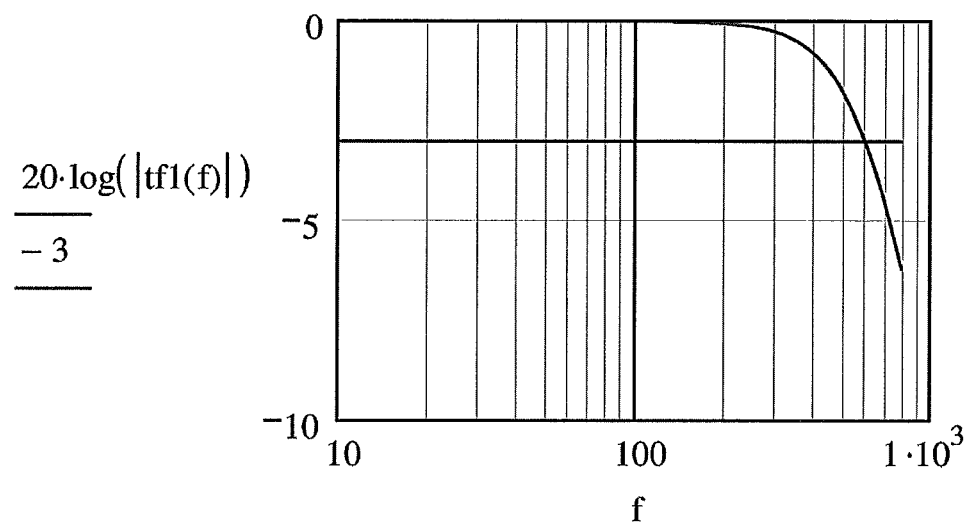
FIGS. 10A and 10B depict the magnitude and phase plots, respectively, of the control system of FIG. 9 showing the resonance removed by the implementation of the methodology of the present invention.
Figure 10B:
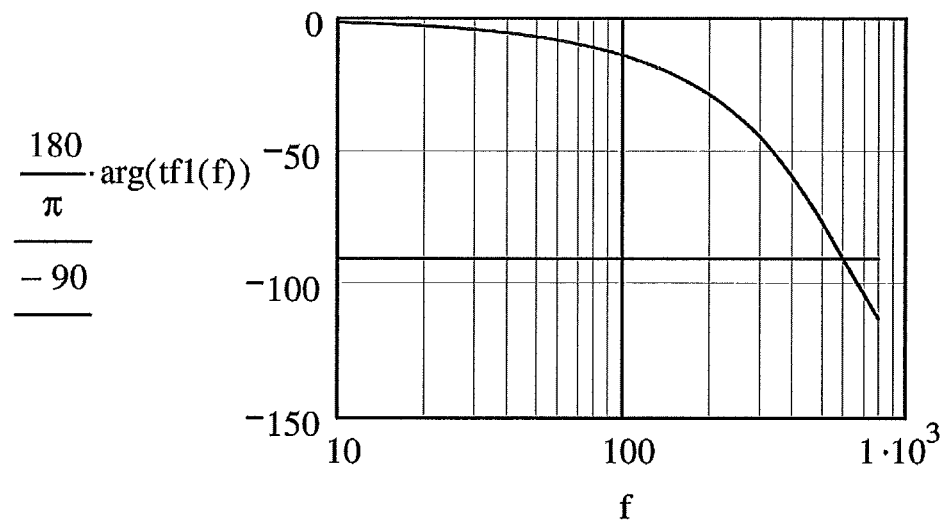

Magnitude and phase plots are depicted in FIGS. 10A and 10B for the mechanism with drivers and sensor(s) inside a control loop with gain and feedback, as calculated using the expressions of equations (12), (13), and (20), where s=j2πf. As can be seen, using the methodology of the present invention, the resonance has been removed.

Figure 11:
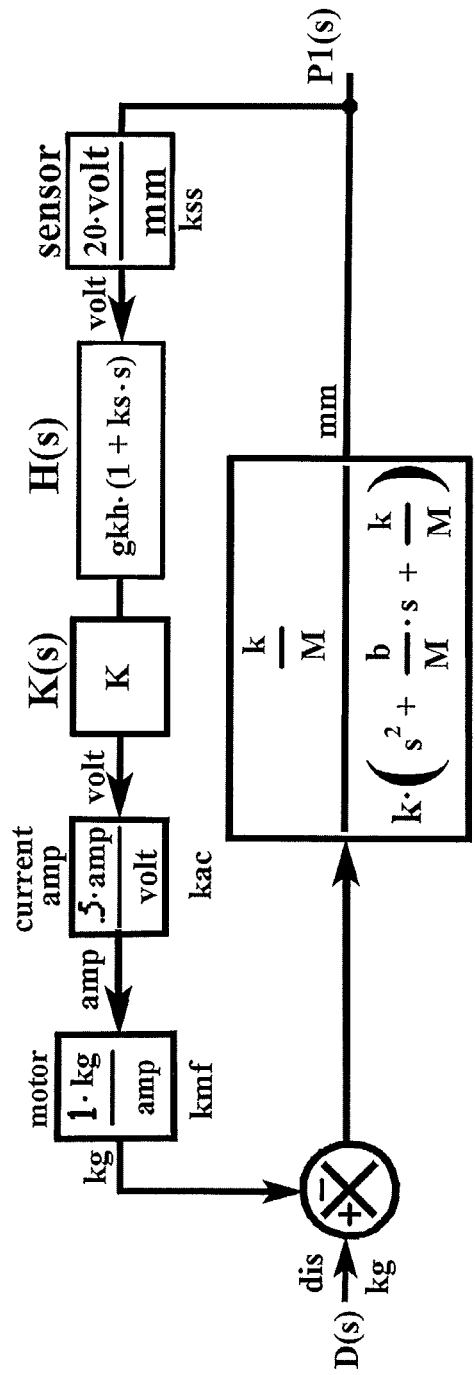
FIG. 11 depicts a rearrangement of the block diagram of the control system of FIG. 9 to investigate further the matter of the disturbance motion.
Figure 12:
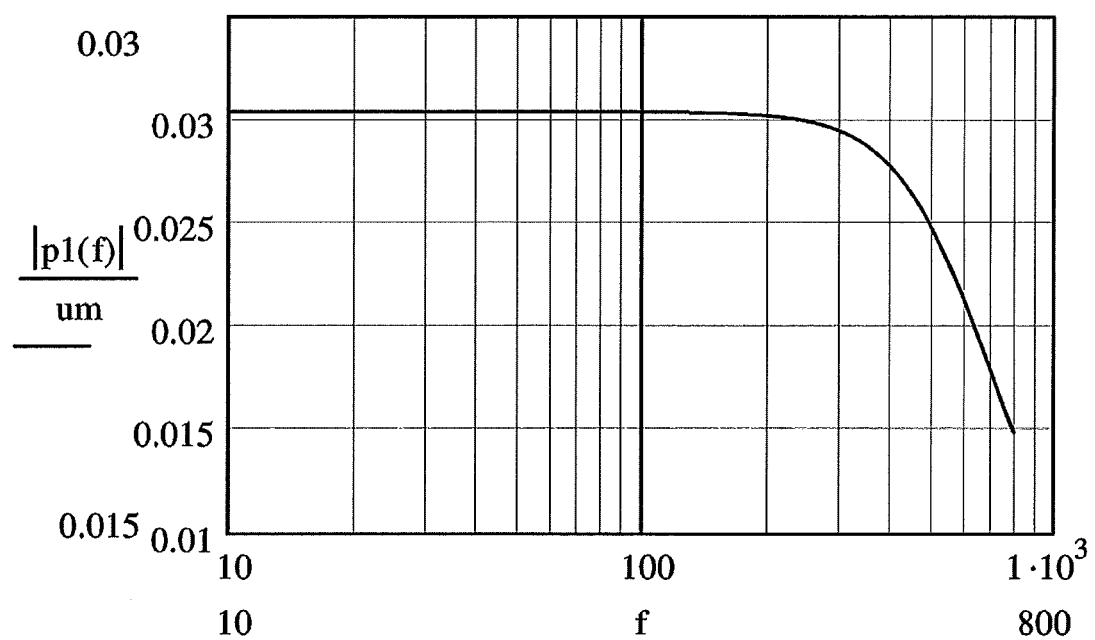
FIG. 12 depicts a plot of the position, p(f), for the example of FIG. 11 caused by a disturbance force as a function of frequency.

FIG. 11 depicts a rearrangement of the block diagram of FIG. 9 to investigate further the matter of the disturbance motion. Comparing p(f) of FIG. 8 to that calculated for FIG. 11 demonstrates the reduction in disturbance. FIG. 12 depicts a plot of the position, p1(f), for the system represented by FIG. 11, caused by a disturbance force, as a function of frequency. Importantly, there is no peaking in the FIG. 12 plot at the resonance of the mechanism.

As demonstrated, the present invention adds gain into the forward path of the control loop of a resonant-prone mechanism with a particular phase lead added to the feedback path of the control loop to eliminate the resonance, where the gain added is a ratio of the square of the system and mechanism frequencies, and the phase lead (H-factor) is a complex ratio of these frequencies which includes a dc-component ($H_{dc}$). By interjecting gain and phase lead, which is contrary to current approaches to eliminating resonance, the present invention achieves the desired result of resonant free application in an otherwise resonant mechanism.

Figure 13A:
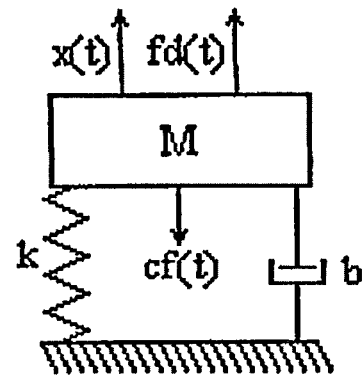
FIGS. 13A and 13B depict spring-mass-damper configurations for an active vibration isolation numerical example.
Figure 13B:
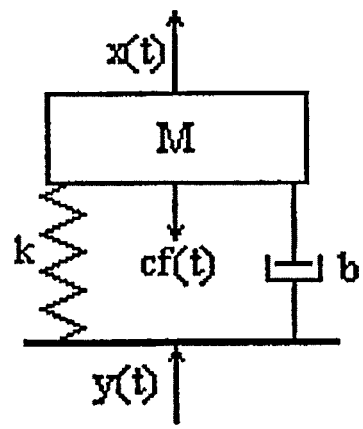

FIGS. 13A and 13B depict spring-mass-damper configurations for an active vibration isolation numerical example. FIG. 13A depicts a spring-mass-damper configuration where the floor remains static. FIG. 13B depicts the same spring-mass-damper configuration with the floor under motion.

In FIG. 13A, the input is $f_d(t)$ and the output is x(t), and the transfer function may be represented by equation (18). The correction force, $c_f(t)$ is also shown, and no floor vibrations are accounted for (the floor remains static).

In FIG. 13B, the input is y(t) and the output is x(t) and $c_f(t)$ is correcting force. In this example, the floor is given vibrations. The transfer function for this example is represented by:

$$X(s) = \frac{(b \cdot s + k) \cdot Y(s)}{Ms^2 + b \cdot s + k} \quad (21)$$

Adding equations (18) and (21) yields:

$$X(s) = [(b \cdot s + k) \cdot Y(s) + F_d(s)] * \frac{1}{k} * \frac{k/M}{s^2 + (b/M)s + k/M} \quad (22)$$

(disturbances)

All of the unwanted forces in the brackets in equation 22 are considered disturbance forces and eliminated from the equation.

As a numerical example, and for demonstrative purposes only, particular values for k and M are selected:

M=40 kg*sec²/m;
b=37.7 kg*sec/m; and
k=3.553(10³) kg/m=3.553 kg/mm.

The values for $\omega_m$, $f_m$, and $\xi_m$ are calculated from the numerical values given above:

$\omega_m=\sqrt{(k/M)}$=9.425 rad/sec;
$f_m=\omega_m/(2\pi)$=1.5 Hz; and
$\xi_m=b/[2(\sqrt{Mk})]$=0.05

These values allow 281.4 μm of displacement for 1 kg of force at 0 Hz with a motor force constant, $k_{mf}$, of 1 kg/amp, a current amp constant, $k_{ac}$, of 0.7106 amp/volt, and a sensor constant, $k_{ss}$, of 5 volt/mm.

Figure 14:
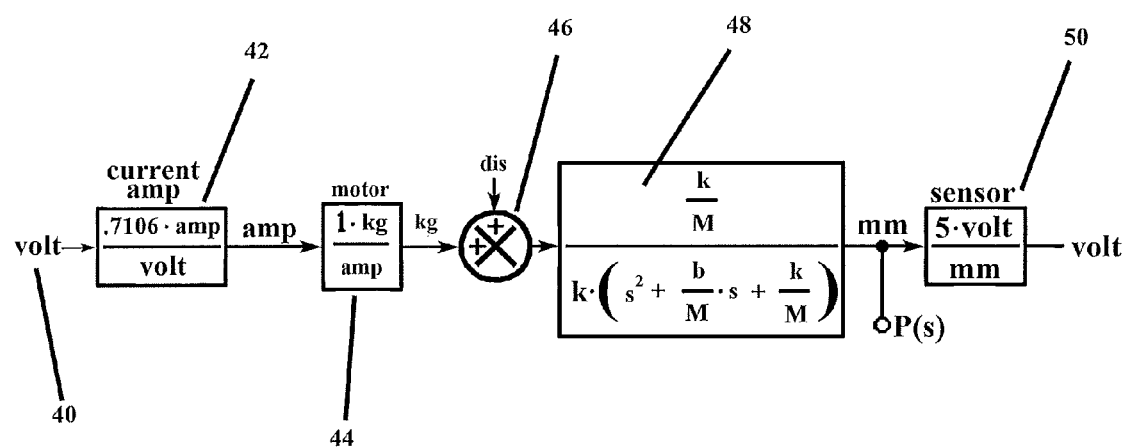
FIG. 14 is a block diagram depicting the drivers and sensors employed to the spring-mass-damper system of FIGS. 13A and 13B.

FIG. 14 is a block diagram depicting the drivers and sensors employed to the spring-mass-damper system of FIGS. 13A and 13B.

Figure 15A:
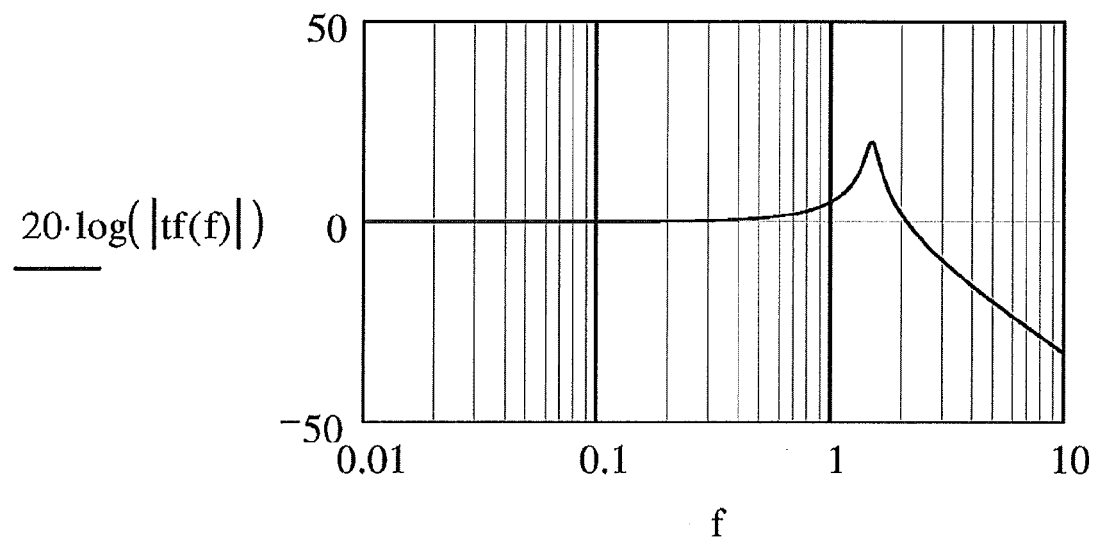
FIGS. 15A and 15B depict the magnitude and phase plots, respectively, of the transfer function of a numerical example of the system of FIG. 14, as a function of frequency with the effects of drivers and sensors included within the results.
Figure 15B:
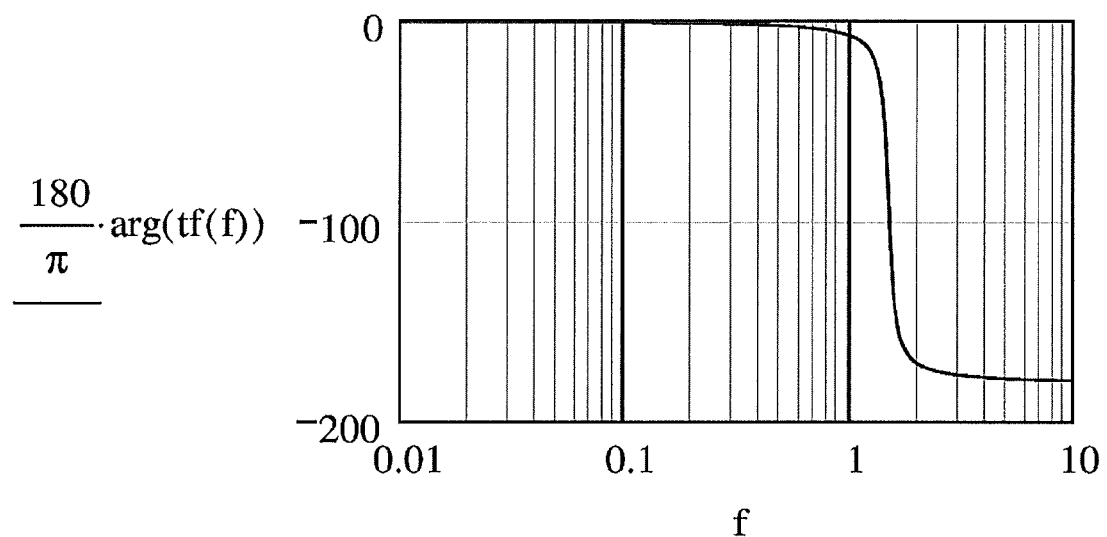

FIGS. 15A and 15B depict the magnitude and phase plots, respectively, of the transfer function of the numerical example of the system of FIG. 14, as a function of frequency with the effects of drivers and sensors included within the results.

Figure 16:
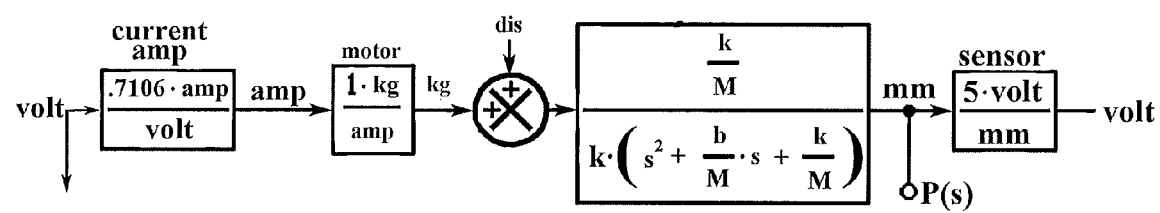
FIG. 16 is a block diagram of the system of FIG. 14 with the input grounded to investigate further the matter of mass motion caused by a disturbance.
Figure 17A:
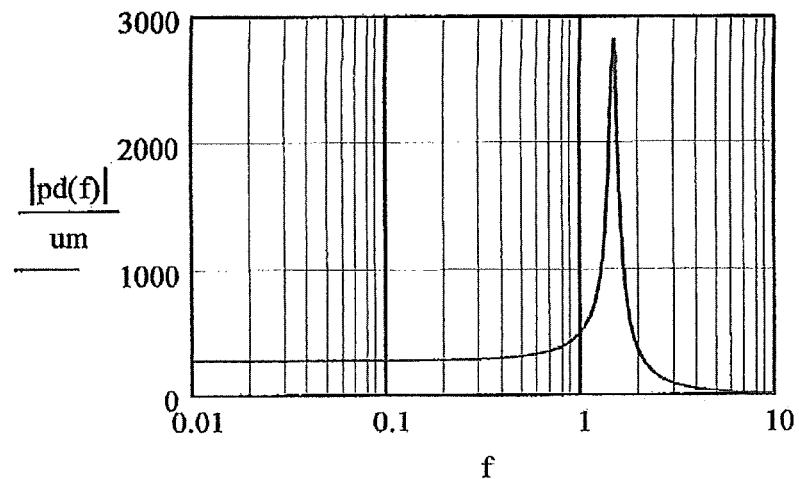
FIGS. 17A and 17B depict plots of position, $p_d(f)$ and $p_{fv}(f)$, for force disturbance and floor vibration disturbance, respectively, with no active isolation.
Figure 17B:
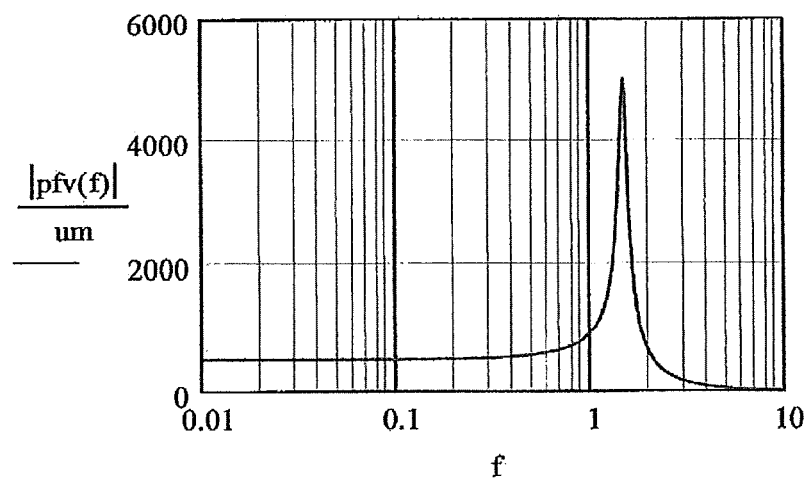

FIG. 16 is a block diagram of the system of FIG. 14 with the input grounded to investigate further the matter of mass motion caused by a disturbance. For the example of FIG. 16, FIGS. 17A and 17B depict plots of position, $p_d(f)$ and $p_{fv}(f)$, for the force disturbance and floor vibration disturbance, respectively, where there is no active isolation.

Applying numerical values to extend this calculation, assuming $f_s$=10 Hz, then:

$\omega_s=2\pi f_s$=62.832 Hz;
$K(s)=\omega_s^2/\omega_m^2$=44.445 (K is equal K(s)).

For a desired flat response at $f_s$, $\xi_s$=1. The gain part of H(s), $g_{kh}$, is calculated from the angular frequencies:

$$g_{kh} = \frac{\omega_s^2 - \omega_m^2}{\omega_s^2} = 0.978$$

And the constant for the s-term, $k_s$, is calculated from the expression:

$$k_s = 2 * \frac{(\xi_s \omega_s - \xi_m \omega_m)}{\omega_s^2 - \omega_m^2} = 0.032 \text{ sec}$$

Figure 18:
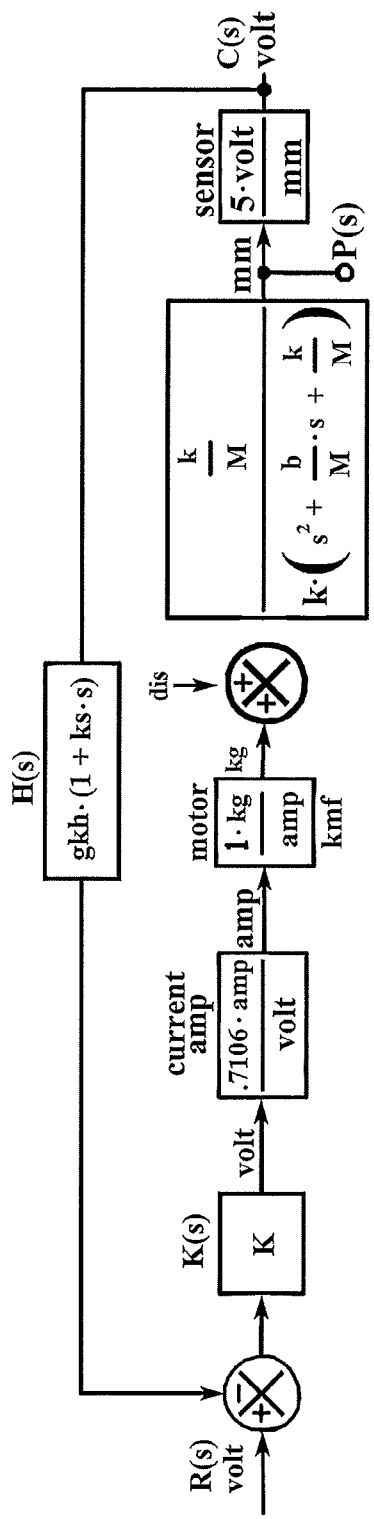
FIG. 18 is a block diagram of the control system of FIG. 14 with gain, K(s), and phase, H(s), properties interjected into the system.
Figure 19:
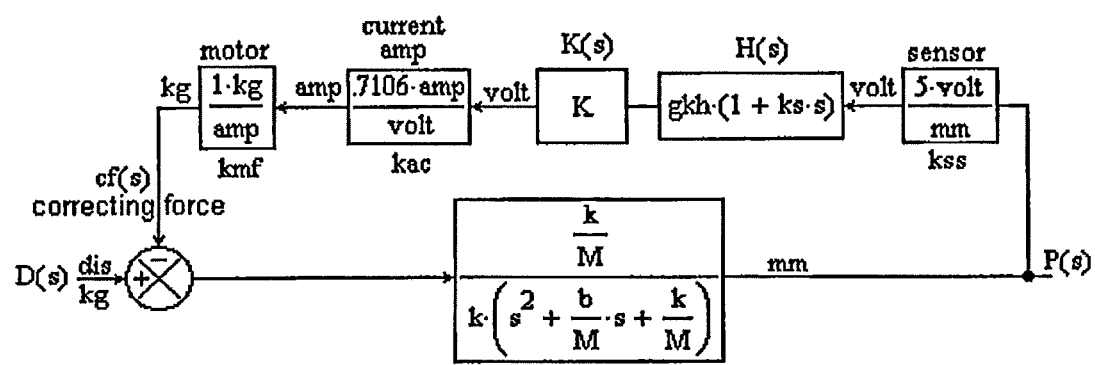
FIG. 19 depicts a rearrangement of the block diagram of the control system of FIG. 18 to investigate further the matter of mass motions caused by a disturbance.

FIG. 18 is a block diagram of the control system of FIG. 14 with gain, K(s), and phase, H(s), properties interjected into the system. FIG. 19 depicts a rearrangement of the block diagram of the control system of FIG. 18 to investigate further the matter of mass motion caused by a disturbance.

Figure 20A:
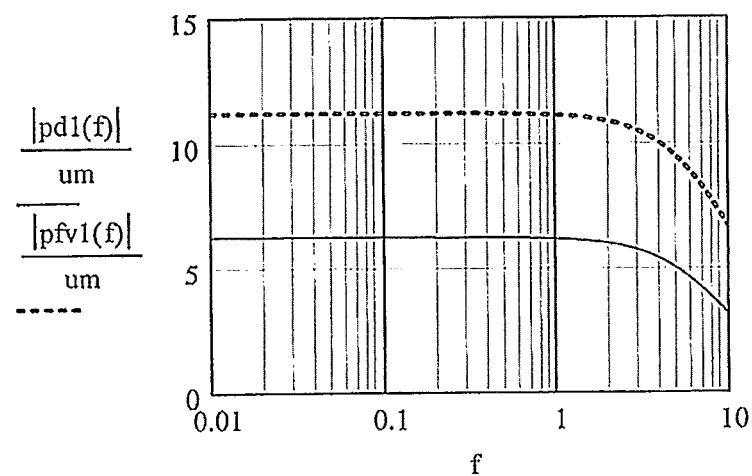
FIGS. 20A and 20B depict plots of position, $p_{d1}(f)$, $p_{fv1}(f)$, $p_{d2}(f)$, and $p_{fv2}(f)$ for the active isolation control system of FIG. 19.

In FIG. 20A, $p_{d1}(f)$ is the result of placing the mechanism inside the control loop of FIG. 1. The damping factor equals 1 when compared to a system without active isolation as depicted by FIG. 17A. Similarly, $p_{fv1}(f)$ is the result of placing the mechanism inside the control loop of FIG. 1. The damping factor equals 1 when compared to a system without active isolation as depicted by FIG. 17B.

Figure 20B:
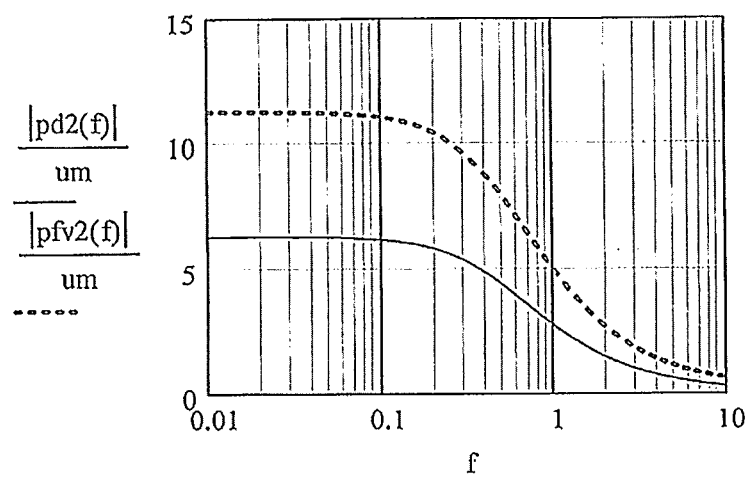

In FIG. 20B, $p_{d2}(f)$ is the result of placing the mechanism inside the control loop of FIG. 1. The damping factor equals 10 when compared to a system without active isolation as depicted by FIG. 17A. Similarly, in FIG. 20B, $p_{fv2}(f)$ is the result of placing the mechanism inside the control loop of FIG. 1. The damping factor equals 10 when compared to a system without active isolation as depicted by FIG. 17B.

Applying the methodology of the present invention, and using equations (12) and (13) to calculate the values of H(s) and K(s) in the control system of FIG. 1 allows the bandwidth to be increased past the limiting 1.5 Hz resonance of the mechanism.

Figure 21:
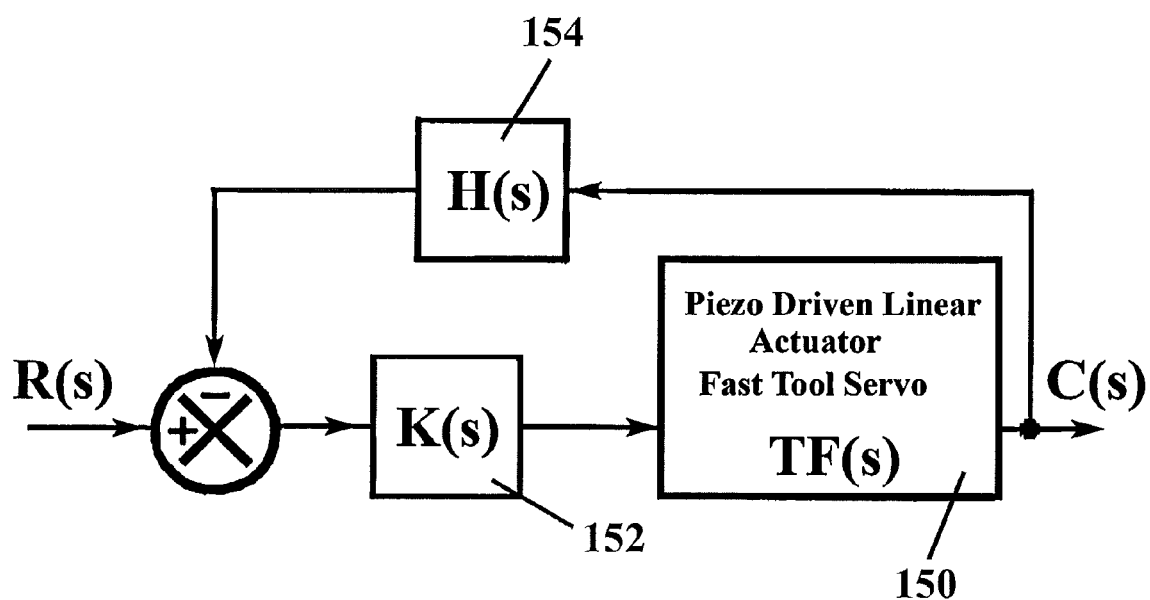
FIG. 21 depicts an exemplary application of the present invention for a canonical second order system for an actuator to be configured to hold a cutting tool for the purpose of cutting rotationally non-symmetric features into the face of a round work piece rotating on a spindle.

FIG. 21 depicts an exemplary application of the methodology of the present invention as it relates to a canonical second order system. The specific application is for an actuator to be configured to hold a cutting tool for the purpose of cutting rotationally non-symmetric features into the face of a round work piece rotating on a spindle. It is a second order canonical system that has resonance that can be detrimental to its operation. In FIG. 21, TF(s) 150 is a linear actuator driven by a piezo-motor, defined as a piezo driven linear actuator. The actuator, as described, is typically a spring-mass system and would have position feedback of a particular type, such as a linear scale, hall-effect sensor, laser interferometer, capacitance sensor, LVDT, or the like. Typically, the total travel would be on the order of 100 µm at, for example, a frequency of 100 Hz. In this example, the small-signal bandwidth of the system has been chosen to be 1.0 kHz. As mass is added to the piezo actuator to allow it to perform its cutting function, e.g., a tool holder with coarse and fine vertical adjustment, the natural frequency decreases. The added mass has thus changed the total mass, for example, by a factor of four, decreasing the natural frequency by half and shifting the natural frequency into the working region of the bandwidth. Configured in this manner, the natural frequency of the system is below the desired bandwidth frequency. In this application, the actuator is referred to as a Fast Tool Servo.

Piezo actuators are not designed to be driven at their natural frequency because the relatively high dynamic forces have the ability to compromise the structural integrity of the ceramic material itself ultimately causing irreversible damage to the actuator. In position applications (such as a Fast Tool Servo), piezo actuators are operated considerably below the resonant frequency in order to keep the phase shift between the command signal and the displacement low. For these reasons, the bandwidth of the system has typically been limited to somewhere below where the natural frequency occurs.

By employing the invention, electronics to adjust the system's gain provide a gain component for adding gain into the forward path of the control loop of a resonant-prone mechanism, wherein the gain added includes a function of the system and mechanism frequencies; and electronics to adjust the system's phase provide a phase component for adding a phase lead or feedback factor (H-factor) into the feedback path of the control loop of the resonant-prone mechanism, the phase lead being a complex ratio of said system and mechanism frequencies.

Electronics for adding gain into the forward path of the control loop of the resonant-prone mechanism are represented by the K(s) system block 152, and electronics for adding a phase lead or feedback factor (H-factor) to the feedback loop of the control circuit of the resonant-prone mechanism are represented by the H(s) system block 154, the piezo driven linear actuator 150 can be controlled through the natural frequency resonance without any adverse effects to the piezo and at the same time achieve the desired small-signal bandwidth for the system. In this manner, the total travel of 100 µm at a frequency of 100 Hz will have been achieved by the application of the methodology of the present invention.

It should be noted that the present invention is not limited to a particular application, such as the aforementioned application in a Fast Tool Servo, and is certainly pertinent for other second order canonical systems where resonance plays an important and perhaps detrimental role in the system performance. Applications in electronics, acoustics, as well as second order mechanical systems lend themselves to the methodology of the present invention.

Figure 22:
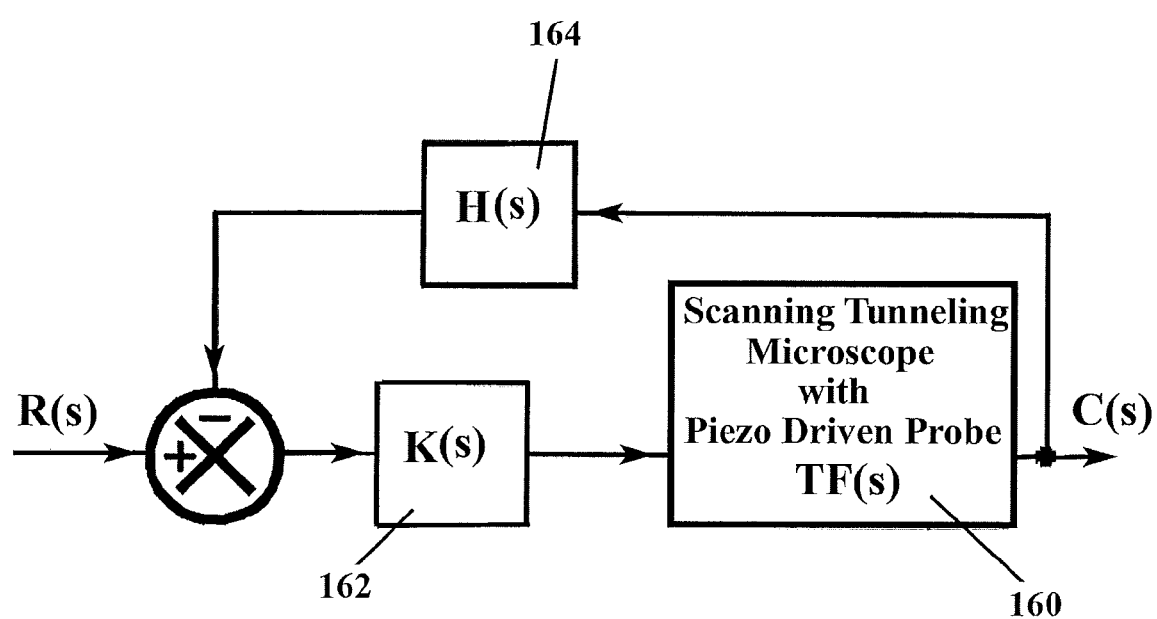
FIG. 22 depicts another exemplary application of the present invention for a canonical second order system for a scanning tunneling microscope using a piezo-electric positioner.

FIG. 22 depicts another exemplary application of the methodology of the present invention as it relates to a canonical second order system. This specific application is for a scanning tunneling microscope using a piezo-electric positioner. It is another application of a second order canonical system that has resonance that can be detrimental to its operation.

Fast response is a characteristic feature of piezo actuators. A fast change in the command voltage sent to the actuator results in a fast position change. This feature is especially important and desirable in dynamic applications such as Fast Tool Servos, active vibration control, or scanning microscopy, to name just a few. As the command voltage suddenly increases, the piezo actuator reaches its commanded displacement in about one third of the period of its resonant frequency. Overshoot occurs and it can take milliseconds at full stroke before the piezo actuator is at the nominal commanded position. This overshoot settling time can, over many cycles at full travel or near to full travel, add considerable time to any process requiring a stable actuator. Scanning Tunneling Microscopes (STM) that use piezo actuator probes are speed limited because of this overshoot settling time. STMs have superior resolution to scanning electron microscopes (SEM) (on the order of 0.1 nm verses 20 nm respectively), but because STM scanning speed is limited, they have not been used in applications such as integrated circuit inspection. The implementation of the methodology of the present invention to a scanning tunneling microscope application achieves the desired result of mitigating the unwanted overshoot settling time.

Scanning Tunneling Microscopes that utilize canonical second order control can benefit greatly from the present invention. When a position change with a specific rise time is made, the overshoot can be caused by the damping ratio, which is generally approximately √2/2. This allows for one overshoot and one undershoot. By utilizing the methodology of the present invention, the bandwidth is increased and the damping ratio is made closer to 1.0, while maintaining the same rise time.

In FIG. 22, TF(s) 160 is the transfer function for the "mechanism," that is, a scanning tunneling microscope with a piezo-driven probe. By employing the invention of interjecting gain 162 into the forward path of the control loop of the resonant-prone mechanism, and adding a phase lead or feedback factor (H-factor) 164 into the feedback path of the control loop of the resonant-prone mechanism, the piezo driven probe can be controlled through the natural frequency resonance without any adverse effects to the piezo and at the same time adjust or compensate for the unwarranted overshoot.

Electronics for interjecting gain into the control loop are represented by the K(s) system block 162, and electronics for interjecting a phase lead or feedback factor (H-factor) into the control loop are represented by the H(s) system block 164, the scanning tunneling microscope with piezo driven probe 160 can be controlled through the natural frequency resonance without any adverse effects to the piezo and at the same time achieve the desired small-signal bandwidth for the system.

It is noted that electronics for producing the H(s) and K(s) components in the aforementioned applications are varied, and the present invention is not limited to any particular assembly of electronic components for performing the H(s) and K(s) phase and gain component functions, provided that the gain and phase interjected adhere to and perform the function necessitated by the algorithms presented above for H(s) and K(s).

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of eliminating peaking and increasing bandwidth of a canonical second order system having a system frequency, and a resonant-prone mechanism having a mechanism frequency, said method comprising:
    forming a control loop for said resonant-prone mechanism, said control loop including a forward path and a feedback path;
    adding gain into said forward path of said control loop, wherein said added gain includes a function of the system and mechanism frequencies; and
    adding a phase lead or feedback factor (H-factor) into said feedback path of said control loop, said phase lead being a complex ratio of said system and mechanism frequencies, and wherein said phase lead or feedback factor is a product of a dc component and a zero-or pole-component.

2. The method of claim 1 wherein said gain added is a ratio of the square of the system and mechanism frequencies.

3. The method of claim 1 wherein said dc component of said phase lead factor is a ratio of the difference in the squares of the angular system frequency and the mechanism frequency, to the square of the system angular frequency.

4. The method of claim 3 wherein said zero- or pole-component is represented by the expression:

$$\left\{1 + 2 * \frac{(\xi_s \omega_s - \xi_m \omega_m)}{\omega_s^2 - \omega_m^2} * s\right\}.$$

5. A method of eliminating peaking and increasing bandwidth of a canonical second order system having a system frequency, and a resonant-prone mechanism having a mechanism frequency, said method comprising:
    forming a control loop for said resonant-prone mechanism, said control loop including a forward path and a feedback path;
    adding gain into said forward path of said control loop for said resonant-prone mechanism wherein said gain interjected includes a ratio of the square of the system and mechanism frequencies; and
    adding a phase lead or feedback factor (H-factor) into said feedback path of said control loop for said resonant-prone mechanism, said phase lead being a complex ratio of said system and mechanism frequencies.

6. The method of claim 5 wherein said phase lead or feedback factor (H-factor) includes a dc-component ($H_{dc}$) and a zero- or pole-component, such that said dc-component is represented by the expression:

$$H_{dc} = \frac{\omega_s^2 - \omega_m^2}{\omega_s^2}$$

and the zero- or pole-component is represented by the expression:

$$\text{zero-component} = \left\{1 + 2 * \frac{(\xi_s \omega_s - \xi_m \omega_m)}{\omega_s^2 - \omega_m^2} * s\right\}$$

where, $\omega_s$ and $\omega_m$ are the system and mechanism angular frequencies, respectively, and $\xi_s$, and $\xi_m$ are the systems and mechanism damping factors, respectively, and the product of the $H_{dc}$ component and the zero-component is the phase lead or feedback factor in the frequency domain to act with said added gain at eliminating the peaking at said mechanism's natural frequency.

7. The method of claim 5 wherein said added gain includes a ratio of the square of the system and mechanism frequencies and is expressed as a gain or control portion, K(s):

$$K(s) = \frac{\omega_s^2}{\omega_m^2}.$$

8. The method of claim 5 including adding said gain and said phase-lead or feedback into said control loop of said system, said gain being expressed as:

$$K(s) = \frac{\omega_s^2}{\omega_m^2};$$

and said phase-lead being expressed as:

$$\frac{\omega_s^2 - \omega_m^2}{\omega_s^2} * \left\{ 1 + 2 * \frac{(\xi_s \omega_s - \xi_m \omega_m)}{\omega_s^2 - \omega_m^2} * s \right\}$$

where, $\omega_s$ and $\omega_m$ are the system and mechanism angular frequencies, respectively, and $\xi_s$ and $\xi_m$ are the systems and mechanism damping factors, respectively.

9. The method of claim 5 wherein said canonical second order system includes a resonating electrical/electronic circuit system having resistance, inductance, and capacitance properties.

10. The method of claim 9 including a system transfer function for said resonating mechanical system having mass, spring, and dampening properties, said transfer function represented in the frequency domain by the expression:

$$\frac{1}{k} * \frac{k/M}{s^2 + (b/M)s + k/M};$$

where, k is said system's spring constant, M is said system's mass, and s is a frequency domain variable.

11. The method of claim 5 wherein said canonical second order system includes a resonating mechanical system having mass, spring, and dampening properties.

12. A method of eliminating peaking and increasing bandwidth of a resonant-prone Fast Tool Servo system having a piezo actuator, a system frequency, and a mechanism frequency, said method comprising:
forming a control loop for said resonant-prone system, said control loop including a forward path and a feedback path;
adding gain into said forward path of said control loop of said system, wherein said gain added includes a function of the system and mechanism frequencies, wherein said gain added is a ratio of the square of the system and mechanism frequencies; and
adding a phase lead or feedback factor (H-factor) into said feedback path of said control loop of said system, said phase lead being a complex ratio of said system and mechanism frequencies.

13. The method of claim 12, wherein said Fast Tool Servo system is represented by a canonical second order system having said system frequency, and a resonant-prone mechanism having said mechanism frequency.

14. The method of claim 12 wherein said phase lead or feedback factor is a product of a dc component and a zero- or pole-component.

15. The method of claim 14 wherein said dc component of said phase lead factor is a ratio of the difference in the squares of the angular system frequency and the mechanism frequency, to the square of the system angular frequency.

16. The method of claim 15 wherein said zero- or pole-component is represented by the expression:

$$\left\{ 1 + 2 * \frac{(\xi_s \omega_s - \xi_m \omega_m)}{\omega_s^2 - \omega_m^2} * s \right\}.$$

17. The method of claim 12 wherein said added gain includes a ratio of the square of the system and mechanism frequencies and is expressed as a gain or control portion, K(s) in the frequency domain:

$$K(s) = \frac{\omega_s^2}{\omega_m^2}.$$

18. The method of claim 12 including adding said gain and said phase-lead or feedback into said control loop of said system, said gain being expressed as:

$$K(s) = \frac{\omega_s^2}{\omega_m^2};$$

and
said phase-lead being expressed as:

$$\frac{\omega_s^2 - \omega_m^2}{\omega_s^2} * \left\{ 1 + 2 * \frac{(\xi_s \omega_s - \xi_m \omega_m)}{\omega_s^2 - \omega_m^2} * s \right\}$$

where, $\omega_s$ and $\omega_m$ are the system and mechanism angular frequencies, respectively, and $\xi_s$ and $\xi_m$ are the systems and mechanism damping factors, respectively.

19. A fast tool servo system having a piezo actuator, a system frequency, and a mechanism frequency, comprising:
a piezo-drive linear actuator;
a fast tool servo;
a control loop having a forward path and a feedback path;
gain electronics to provide a gain component for adding gain into a forward path of said control loop of said system, wherein said gain added includes a function of the system and mechanism frequencies; and
phase electronics to a phase component for adding a phase lead or feedback factor (H-factor) into a feedback path of said control loop of said system, said phase lead being a complex ratio of said system and mechanism frequencies, wherein having said gain being expressed as:

$$K(s) = \frac{\omega_s^2}{\omega_m^2};$$

and
said phase-lead being expressed as:

$$\frac{\omega_s^2 - \omega_m^2}{\omega_s^2} * \left\{ 1 + 2 * \frac{(\xi_s \omega_s - \xi_m \omega_m)}{\omega_s^2 - \omega_m^2} * s \right\}$$

where, $\omega_s$ and $\omega_m$ are the system and mechanism angular frequencies, respectively, and $\xi_s$ and $\xi_m$ are the systems and mechanism damping factors, respectively.

20. A method of mitigating overshoot settling time for a scanning tunneling microscope using a piezo-electric positioner, having a piezo actuator, a system frequency, and a mechanism frequency, said method comprising:
forming a control loop for said system, said control loop including a forward path and a feedback path;
adding gain into said forward path of said control loop of said system, wherein said gain added includes a function of the system and mechanism frequencies; and
adding a phase lead or feedback factor (H-factor) into said feedback path of said control loop of said system, said phase lead being a complex ratio of said system and mechanism frequencies, wherein said phase lead or feedback factor is a product of a dc component and a zero- or pole-component.

21. The method of claim 20, wherein said scanning tunneling microscope system is represented by a canonical second order system having said system frequency, and a resonant mechanism having said mechanism frequency.

22. The method of claim 20 wherein said gain added is a ratio of the square of the system and mechanism frequencies.

23. The method of claim 20 wherein said dc component of said phase lead factor is a ratio of the difference in the squares of the angular system frequency and the mechanism frequencies, to the square of the system angular frequency.

24. The method of claim 23 wherein said zero- or pole-component is represented by the expression:

$$\left\{1 + 2 * \frac{(\xi_s \omega_s - \xi_m \omega_m)}{\omega_s^2 - \omega_m^2} * s\right\}.$$

25. The method of claim 20 wherein said added gain includes a ratio of the square of the system and mechanism frequencies and is expressed as a gain or control portion, K(s):

$$K(s) = \frac{\omega_s^2}{\omega_m^2}.$$

26. The method of claim 20 including adding said gain and said phase-lead or feedback into said control loop of said system, said gain being expressed as:

$$K(s) = \frac{\omega_s^2}{\omega_m^2};$$

and
said phase-lead being expressed as:

$$\frac{\omega_s^2 - \omega_m^2}{\omega_s^2} * \left\{1 + 2 * \frac{(\xi_s \omega_s - \xi_m \omega_m)}{\omega_s^2 - \omega_m^2} * s\right\}$$

where, $\omega_s$ and $\omega_m$ are the system and mechanism angular frequencies, respectively, and $\xi_s$ and $\xi_m$ are the systems and mechanism damping factors, respectively.

27. A scanning tunneling microscope using a piezo-electric positioner, having a piezo actuator, a system frequency, and a mechanism frequency, comprising:
a scanning tunneling microscope;
a piezo-electric positioner;
a control loop having a forward path and feedback path;
gain electronics to provide a gain component for adding gain into said forward path of said control loop of said system, wherein said gain added includes a function of the system and mechanism frequencies; and
phase electronics to provide a phase component for adding a phase lead or feedback factor (H-factor) into said feedback path of said control loop of said system, said phase lead being a complex ratio of said system and mechanism frequencies;
including having said gain and phase electronics for adding said gain and said phase-lead or feedback into said system, said gain being expressed as:

$$K(s) = \frac{\omega_s^2}{\omega_m^2};$$

and
said phase-lead being expressed as:

$$\frac{\omega_s^2 - \omega_m^2}{\omega_s^2} * \left\{1 + 2 * \frac{(\xi_s \omega_s - \xi_m \omega_m)}{\omega_s^2 - \omega_m^2} * s\right\}$$

where, $\omega_s$ and $\omega_m$ are the system and mechanism angular frequencies, respectively, and $\xi_s$ and $\xi_m$ are the system and mechanism damping factors, respectively.

* * * * *